USOO6353843B1

(12) United States Patent
Chehrazi et al.

(10) Patent No.: US 6,353,843 B1
(45) Date of Patent: Mar. 5, 2002

(54) HIGH PERFORMANCE UNIVERSAL MULTIPLIER CIRCUIT

(75) Inventors: Farzad Chehrazi, San Jose; Vojin G. Oklobdzija, Berkeley; Aamir A. Farooqui, Sunnyvale, all of CA (US)

(73) Assignees: Sony Corporation of Japan, Tokyo (JP); Sony Electronics, Inc., Park Ridge, NJ (US)

( * ) Notice: Subject to any disclaimer, the term of this patent is extended or adjusted under 35 U.S.C. 154(b) by 0 days.

(21) Appl. No.: 09/415,485

(22) Filed: Oct. 8, 1999

(51) Int. Cl.[7] .............................................. G06F 7/52

(52) U.S. Cl. .................................................... 708/631

(58) Field of Search ............................... 708/631, 628, 708/625

(56) References Cited

U.S. PATENT DOCUMENTS

| 5,343,416 | A |   | 8/1994 | Eisig et al. ................. 364/757 |
| 5,506,799 | A |   | 4/1996 | Nakao ......................... 364/760 |
| 5,764,558 | A | * | 6/1998 | Pearson et al. ............. 708/625 |
| 5,880,985 | A | * | 3/1999 | Makineni et al. ........... 708/625 |
| 5,943,250 | A |   | 8/1999 | Kim et al. .................. 364/757 |
| 6,035,318 | A | * | 3/2000 | Abdallah .................... 708/628 |
| 6,038,583 | A | * | 3/2000 | Oberman et al. ........... 708/628 |

OTHER PUBLICATIONS

A. Farooqui et al.; "Multiplexer Based Adder for Media Signal Processing"; LSI System Laboratory, SONY US Research Laboratories, San Jose, CA; Integration Corp., Berkeley, CA.

A. Farooqui et al.; "VLSI Implementation of Early Branch Prediction Circuits for High Performance Computing"; Dept. of Electrical and Computer Eng., University of CA, Davis, CA; Integration Berkeley, CA; 1999 IEEE.

* cited by examiner

Primary Examiner—David H. Malzahn
(74) Attorney, Agent, or Firm—Wagner Murabito & Hao LLP

(57) ABSTRACT

A partitioned multiplier circuit which is designed for high speed operations. The multiplier of the present invention can perform one 32×32 bit multiplication, two 16×16 bit multiplications (simultaneously) or four 8×8 bit multiplications (simultaneously) depending on input partitioning signals. The time required to perform either the 32×32 bit or the 16×16 bit or the 8×8 bit multiplications is constant. Therefore, multiplication results are available with a constant latency regardless of operand bit-size. In one embodiment, the latency is two clock cycles but the multiplier circuit has a throughput of one clock cycle due to pipelining. The input operands can be signed or unsigned. The hardware is partitioned without any significant increase in the delay or area and the multiplier can provide six different modes of operation. In one embodiment, Booth encoding is used for the generation of 17 partial products which are compressed using a compression tree into two 64-bit values. This is performed in the first pipeline stage to generate a sum and a carry vector. These values are then added, in the second pipestage, using a carry propagate adder circuit to provide a single 64-bit result. In the case of 16×16 bit multiplication, the 64-bit result contains two 32-bit results. In the case of 8×8 bit multiplication, the 64-bit result contains four 16-bit results. Due to its high operating speed, the multiplier circuit is advantageous for use in multi-media applications, such as audio/visual rendering and playback.

28 Claims, 31 Drawing Sheets

FIGURE 2B

| COL. # | 63 62 61 60 59 58 57 56 55 54 53 52 51 50 49 48 47 46 45 44 43 42 41 40 39 38 37 36 35 34 33 |
|---|---|
| PP_A | 07 07 07 07 07 07 07 07 07 06 05 04 03 02 01 00 07 07 07 07 07 07 07 07 06 05 04 03 02 01 |
| PP_B | 07 07 07 07 07 07 07 06 05 04 03 02 01 00 np 07 07 07 07 07 07 07 06 05 04 03 02 01 00 |
| PP_C | 07 07 07 07 07 06 05 04 03 02 01 00 np 07 07 07 07 06 05 04 03 02 01 00 np |
| PP_D | 07 07 07 06 05 04 03 02 01 00 np 07 07 07 06 05 04 03 02 01 00 |
| PP_E | 07 06 05 04 03 02 01 00 np 07 06 05 04 03 02 01 00 np |
| PP_F | | |
| PP_G | | |
| PP_H | | |
| PP_I | | |
| PP_J | | |
| PP_K | | |
| PP_L | | |
| PP_M | | |
| PP_N | | |
| PP_O | | |
| PP_P | | |
| PP_Q | | |

| COL. # | 32 | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|---|---|---|---|---|---|---|---|---|---|---|---|---|---|---|---|---|
| PP_A | 00 | 07 | 07 | 07 | 07 | 07 | 07 | 07 | 07 | 07 | 07 | 07 | 07 | 07 | 07 | 07 | 07 | 07 | 07 | 07 | 07 | 07 | 07 | 07 | 07 | 07 | 06 | 05 | 04 | 03 | 02 | 01 | 00 |
| PP_B | np | 07 | 07 | 07 | 07 | 07 | 07 | 07 | 07 | 07 | 07 | 07 | 07 | 07 | 07 | 07 | 07 | 07 | 07 | 07 | 07 | 07 | 07 | 06 | 05 | 04 | 03 | 02 | 01 | 00 | r0 | | |
| PP_C | | | | | | | np | 07 | 07 | 07 | 07 | 07 | 07 | 07 | 07 | 07 | 07 | 07 | 07 | 07 | 07 | 07 | 06 | 05 | 04 | 03 | 02 | 01 | 00 | r2 | | | |
| PP_D | | | | | | | | | | | | | np | 07 | 07 | 07 | 07 | 07 | 07 | 07 | 07 | 07 | 06 | 05 | 04 | 03 | 02 | 01 | 00 | r4 | | | |
| PP_E | | | | | | | | | | | | | | | | | | | | 07 | 07 | 07 | 06 | 05 | 04 | 03 | 02 | 01 | 00 | r6 | | | |
| PP_F | | | | | | | | | | | | | | | | | | | | | | | 07 | 06 | 05 | 04 | 03 | 02 | 01 | 00 | | | |
| PP_G | | | | | | | | | | | | | | | | | | | | | | | | | | | | | | | | | |
| PP_H | | | | | | | | | | | | | | | | | | | | | | | | | | | | | | | | | |
| PP_I | | | | | | | | | | | | | | | | | | | | | | | | | | | | | | | | | |
| PP_J | | | | | | | | | | | | | | | | | | | | | | | | | | | | | | | | | |
| PP_K | | | | | | | | | | | | | | | | | | | | | | | | | | | | | | | | | |
| PP_L | | | | | | | | | | | | | | | | | | | | | | | | | | | | | | | | | |
| PP_M | | | | | | | | | | | | | | | | | | | | | | | | | | | | | | | | | |
| PP_N | | | | | | | | | | | | | | | | | | | | | | | | | | | | | | | | | |
| PP_O | | | | | | | | | | | | | | | | | | | | | | | | | | | | | | | | | |
| PP_P | | | | | | | | | | | | | | | | | | | | | | | | | | | | | | | | | |
| PP_Q | | | | | | | | | | | | | | | | | | | | | | | | | | | | | | | | | |

| COL. # | 63 | 62 | 61 | 60 | 59 | 58 | 57 | 56 | 55 | 54 | 53 | 52 | 51 | 50 | 49 | 48 | 47 | 46 | 45 | 44 | 43 | 42 | 41 | 40 | 39 | 38 | 37 | 36 | 35 | 34 | 33 |
|---|---|---|---|---|---|---|---|---|---|---|---|---|---|---|---|---|---|---|---|---|---|---|---|---|---|---|---|---|---|---|---|
| PP_A | 15 | 15 | 15 | 15 | 15 | 15 | 15 | 15 | 15 | 15 | 15 | 15 | 15 | 15 | 15 | 15 | 15 | 14 | 13 | 12 | 11 | 10 | 09 | 08 | 07 | 06 | 05 | 04 | 03 | 02 | 01 |
| PP_B | 15 | 15 | 15 | 15 | 15 | 15 | 15 | 15 | 15 | 15 | 15 | 15 | 15 | 15 | 15 | 15 | 15 | 15 | 14 | 13 | 12 | 11 | 10 | 09 | 08 | 07 | 06 | 05 | 04 | 03 | 02 | 01 | 00 |
| PP_C | 15 | 15 | 15 | 15 | 15 | 15 | 15 | 15 | 15 | 15 | 15 | 15 | 15 | 15 | 15 | 15 | 15 | 14 | 13 | 12 | 11 | 10 | 09 | 08 | 07 | 06 | 05 | 04 | 03 | 02 | 01 | 00 | np |
| PP_D | 15 | 15 | 15 | 15 | 15 | 15 | 15 | 15 | 15 | 15 | 15 | 15 | 15 | 15 | 15 | 15 | 14 | 13 | 12 | 11 | 10 | 09 | 08 | 07 | 06 | 05 | 04 | 03 | 02 | 01 | 00 |
| PP_E | 15 | 15 | 15 | 15 | 15 | 15 | 15 | 15 | 15 | 15 | 15 | 15 | 15 | 15 | 15 | 14 | 13 | 12 | 11 | 10 | 09 | 08 | 07 | 06 | 05 | 04 | 03 | 02 | 01 | 00 | np |
| PP_F | 15 | 15 | 15 | 15 | 15 | 15 | 15 | 15 | 15 | 15 | 15 | 15 | 15 | 15 | 14 | 13 | 12 | 11 | 10 | 09 | 08 | 07 | 06 | 05 | 04 | 03 | 02 | 01 | 00 |
| PP_G | 15 | 15 | 15 | 15 | 15 | 15 | 15 | 15 | 15 | 15 | 15 | 15 | 15 | 14 | 13 | 12 | 11 | 10 | 09 | 08 | 07 | 06 | 05 | 04 | 03 | 02 | 01 | 00 | np |
| PP_H | 15 | 15 | 15 | 15 | 15 | 15 | 15 | 15 | 15 | 15 | 15 | 15 | 14 | 13 | 12 | 11 | 10 | 09 | 08 | 07 | 06 | 05 | 04 | 03 | 02 | 01 | 00 |
| PP_I | 15 | 15 | 15 | 15 | 15 | 15 | 15 | 15 | 15 | 15 | 15 | 14 | 13 | 12 | 11 | 10 | 09 | 08 | 07 | 06 | 05 | 04 | 03 | 02 | 01 | 00 | np |
| PP_J | 15 | 15 | 15 | 15 | 15 | 15 | 15 | 15 | 15 | 15 | 14 | 13 | 12 | 11 | 10 | 09 | 08 | 07 | 06 | 05 | 04 | 03 | 02 | 01 | 00 |
| PP_K | | | | | | | | | | | | | | | | | | | | | | | | | | | | | | | |
| PP_L | | | | | | | | | | | | | | | | | | | | | | | | | | | | | | | |
| PP_M | | | | | | | | | | | | | | | | | | | | | | | | | | | | | | | |
| PP_N | | | | | | | | | | | | | | | | | | | | | | | | | | | | | | | |
| PP_O | | | | | | | | | | | | | | | | | | | | | | | | | | | | | | | |
| PP_P | | | | | | | | | | | | | | | | | | | | | | | | | | | | | | | |
| PP_Q | | | | | | | | | | | | | | | | | | | | | | | | | | | | | | | |

| COL. # | 32 | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|---|---|---|---|---|---|---|---|---|---|---|---|---|---|---|---|---|
| PP_A | 00 | 15 | 15 | 15 | 15 | 15 | 15 | 15 | 15 | 15 | 15 | 15 | 15 | 15 | 15 | 15 | 15 | 15 | 15 | 14 | 13 | 12 | 11 | 10 | 09 | 08 | 07 | 06 | 05 | 04 | 03 | 02 | 01 00 r0 |
| PP_B | np | 15 | 15 | 15 | 15 | 15 | 15 | 15 | 15 | 15 | 15 | 15 | 15 | 15 | 15 | 15 | 15 | 15 | 14 | 13 | 12 | 11 | 10 | 09 | 08 | 07 | 06 | 05 | 04 | 03 | 02 | 01 00 | r2 |
| PP_C |  | 15 | 15 | 15 | 15 | 15 | 15 | 15 | 15 | 15 | 15 | 15 | 15 | 15 | 15 | 15 | 15 | 14 | 13 | 12 | 11 | 10 | 09 | 08 | 07 | 06 | 05 | 04 | 03 | 02 | 01 00 | r4 |  |
| PP_D |  |  | 15 | 15 | 15 | 15 | 15 | 15 | 15 | 15 | 15 | 15 | 15 | 15 | 15 | 15 | 14 | 13 | 12 | 11 | 10 | 09 | 08 | 07 | 06 | 05 | 04 | 03 | 02 | 01 00 | r6 |  |  |
| PP_E |  |  |  | 15 | 15 | 15 | 15 | 15 | 15 | 15 | 15 | 15 | 15 | 15 | 15 | 14 | 13 | 12 | 11 | 10 | 09 | 08 | 07 | 06 | 05 | 04 | 03 | 02 | 01 00 | r8 |  |  |  |
| PP_F |  |  |  |  | 15 | 15 | 15 | 15 | 15 | 15 | 15 | 15 | 15 | 15 | 14 | 13 | 12 | 11 | 10 | 09 | 08 | 07 | 06 | 05 | 04 | 03 | 02 | 01 00 | r10 |  |  |  |  |
| PP_G |  |  |  |  |  | 15 | 15 | 15 | 15 | 15 | 15 | 15 | 15 | 14 | 13 | 12 | 11 | 10 | 09 | 08 | 07 | 06 | 05 | 04 | 03 | 02 | 01 00 | r12 |  |  |  |  |  |
| PP_H |  |  |  |  |  |  | 15 | 15 | 15 | 15 | 15 | 15 | 14 | 13 | 12 | 11 | 10 | 09 | 08 | 07 | 06 | 05 | 04 | 03 | 02 | 01 00 | r14 |  |  |  |  |  |  |
| PP_I |  |  |  |  |  |  |  |  |  |  |  |  |  |  |  |  |  |  |  |  |  |  |  |  |  |  |  |  |  |  |  |  |  |
| PP_J |  |  |  |  |  |  |  |  |  |  |  |  |  |  |  |  |  |  |  |  |  |  |  |  |  |  |  |  |  |  |  |  |  |
| PP_K |  |  |  |  |  |  |  |  |  |  |  |  |  |  |  |  |  |  |  |  |  |  |  |  |  |  |  |  |  |  |  |  |  |
| PP_L |  |  |  |  |  |  |  |  |  |  |  |  |  |  |  |  |  |  |  |  |  |  |  |  |  |  |  |  |  |  |  |  |  |
| PP_M |  |  |  |  |  |  |  |  |  |  |  |  |  |  |  |  |  |  |  |  |  |  |  |  |  |  |  |  |  |  |  |  |  |
| PP_N |  |  |  |  |  |  |  |  |  |  |  |  |  |  |  |  |  |  |  |  |  |  |  |  |  |  |  |  |  |  |  |  |  |
| PP_O |  |  |  |  |  |  |  |  |  |  |  |  |  |  |  |  |  |  |  |  |  |  |  |  |  |  |  |  |  |  |  |  |  |
| PP_P |  |  |  |  |  |  |  |  |  |  |  |  |  |  |  |  |  |  |  |  |  |  |  |  |  |  |  |  |  |  |  |  |  |
| PP_Q |  |  |  |  |  |  |  |  |  |  |  |  |  |  |  |  |  |  |  |  |  |  |  |  |  |  |  |  |  |  |  |  |  |

| COL. # | 63 | 62 | 61 | 60 | 59 | 58 | 57 | 56 | 55 | 54 | 53 | 52 | 51 | 50 | 49 | 48 | 47 | 46 | 45 | 44 | 43 | 42 | 41 | 40 | 39 | 38 | 37 | 36 | 35 | 34 | 33 |
|---|---|---|---|---|---|---|---|---|---|---|---|---|---|---|---|---|---|---|---|---|---|---|---|---|---|---|---|---|---|---|---|
| PP_A | 31 | 31 | 31 | 31 | 31 | 31 | 31 | 31 | 31 | 31 | 31 | 31 | 31 | 31 | 31 | 31 | 31 | 31 | 31 | 31 | 31 | 31 | 31 | 31 | 31 | 31 | 31 | 31 | 31 | 31 | 31 |
| PP_B | 31 | 31 | 31 | 31 | 31 | 31 | 31 | 31 | 31 | 31 | 31 | 31 | 31 | 31 | 31 | 31 | 31 | 31 | 31 | 31 | 31 | 31 | 31 | 31 | 31 | 31 | 31 | 31 | 31 | 30 | 29 |
| PP_C | 31 | 31 | 31 | 31 | 31 | 31 | 31 | 31 | 31 | 31 | 31 | 31 | 31 | 31 | 31 | 31 | 31 | 31 | 31 | 31 | 31 | 31 | 31 | 31 | 31 | 31 | 31 | 30 | 29 | 28 | 27 |
| PP_D | 31 | 31 | 31 | 31 | 31 | 31 | 31 | 31 | 31 | 31 | 31 | 31 | 31 | 31 | 31 | 31 | 31 | 31 | 31 | 31 | 31 | 31 | 31 | 31 | 31 | 31 | 30 | 29 | 28 | 27 | 26 | 25 |
| PP_E | 31 | 31 | 31 | 31 | 31 | 31 | 31 | 31 | 31 | 31 | 31 | 31 | 31 | 31 | 31 | 31 | 31 | 31 | 31 | 31 | 31 | 31 | 31 | 31 | 31 | 30 | 29 | 28 | 27 | 26 | 25 | 24 | 23 |
| PP_F | 31 | 31 | 31 | 31 | 31 | 31 | 31 | 31 | 31 | 31 | 31 | 31 | 31 | 31 | 31 | 31 | 31 | 31 | 31 | 31 | 31 | 31 | 31 | 31 | 30 | 29 | 28 | 27 | 26 | 25 | 24 | 23 | 22 | 21 |
| PP_G | 31 | 31 | 31 | 31 | 31 | 31 | 31 | 31 | 31 | 31 | 31 | 31 | 31 | 31 | 31 | 31 | 31 | 31 | 31 | 31 | 31 | 31 | 31 | 30 | 29 | 28 | 27 | 26 | 25 | 24 | 23 | 22 | 21 | 20 | 19 |
| PP_H | 31 | 31 | 31 | 31 | 31 | 31 | 31 | 31 | 31 | 31 | 31 | 31 | 31 | 31 | 31 | 31 | 31 | 31 | 31 | 31 | 31 | 31 | 30 | 29 | 28 | 27 | 26 | 25 | 24 | 23 | 22 | 21 | 20 | 19 | 18 | 17 |
| PP_I | 31 | 31 | 31 | 31 | 31 | 31 | 31 | 31 | 31 | 31 | 31 | 31 | 31 | 31 | 31 | 31 | 31 | 31 | 31 | 31 | 31 | 30 | 29 | 28 | 27 | 26 | 25 | 24 | 23 | 22 | 21 | 20 | 19 | 18 | 17 | 16 | 15 |
| PP_J | 31 | 31 | 31 | 31 | 31 | 31 | 31 | 31 | 31 | 31 | 31 | 31 | 31 | 31 | 31 | 31 | 31 | 31 | 31 | 31 | 30 | 29 | 28 | 27 | 26 | 25 | 24 | 23 | 22 | 21 | 20 | 19 | 18 | 17 | 16 | 15 | 14 | 13 |
| PP_K | 31 | 31 | 31 | 31 | 31 | 31 | 31 | 31 | 31 | 31 | 31 | 31 | 31 | 31 | 31 | 31 | 31 | 31 | 31 | 30 | 29 | 28 | 27 | 26 | 25 | 24 | 23 | 22 | 21 | 20 | 19 | 18 | 17 | 16 | 15 | 14 | 13 | 12 | 11 |
| PP_L | 31 | 31 | 31 | 31 | 31 | 31 | 31 | 31 | 31 | 31 | 31 | 31 | 31 | 31 | 31 | 31 | 31 | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 |
| PP_M | 31 | 31 | 31 | 31 | 31 | 31 | 31 | 31 | 31 | 31 | 31 | 31 | 31 | 31 | 31 | 31 | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 |
| PP_N | 31 | 31 | 31 | 31 | 31 | 31 | 31 | 31 | 31 | 31 | 31 | 31 | 31 | 31 | 31 | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 |
| PP_O | 31 | 31 | 31 | 31 | 31 | 31 | 31 | 31 | 31 | 31 | 31 | 31 | 31 | 31 | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 |
| PP_P | 31 | 31 | 31 | 31 | 31 | 31 | 31 | 31 | 31 | 31 | 31 | 31 | 31 | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 |
| PP_Q | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 |

FIGURE 6D

| COL. # | 32 31 30 29 28 27 26 25 24 23 22 21 20 19 18 17 16 15 14 13 12 11 10 09 08 07 06 05 04 03 02 01 00 |
|---|---|
| PP_A | 31 30 29 28 27 26 25 24 23 22 21 20 19 18 17 16 15 14 13 12 11 10 09 08 07 06 05 04 03 02 01 00 r0 |
| PP_B | 30 29 28 27 26 25 24 23 22 21 20 19 18 17 16 15 14 13 12 11 10 09 08 07 06 05 04 03 02 01 00 r2 |
| PP_C | 28 27 26 25 24 23 22 21 20 19 18 17 16 15 14 13 12 11 10 09 08 07 06 05 04 03 02 01 00 r4 |
| PP_D | 26 25 24 23 22 21 20 19 18 17 16 15 14 13 12 11 10 09 08 07 06 05 04 03 02 01 00 r6 |
| PP_E | 24 23 22 21 20 19 18 17 16 15 14 13 12 11 10 09 08 07 06 05 04 03 02 01 00 r8 |
| PP_F | 22 21 20 19 18 17 16 15 14 13 12 11 10 09 08 07 06 05 04 03 02 01 00 r10 |
| PP_G | 20 19 18 17 16 15 14 13 12 11 10 09 08 07 06 05 04 03 02 01 00 r12 |
| PP_H | 18 17 16 15 14 13 12 11 10 09 08 07 06 05 04 03 02 01 00 r14 |
| PP_I | 16 15 14 13 12 11 10 09 08 07 06 05 04 03 02 01 00 |
| PP_J | 14 13 12 11 10 09 08 07 06 05 04 03 02 01 00 |
| PP_K | 12 11 10 09 08 07 06 05 04 03 02 01 00 |
| PP_L | 10 09 08 07 06 05 04 03 02 01 00 |
| PP_M | 08 07 06 05 04 03 02 01 00 |
| PP_N | 06 05 04 03 02 01 00 |
| PP_O | 04 03 02 01 00 |
| PP_P | 02 01 00 |
| PP_Q | 00 |

| | BITS 63......48 | | EN$_x$ 4 |
|---|---|---|---|
| | BYTE MODE 412 | HALF WORD MODE 414 | FULL WORD MODE 416 |
| PPA 1 | BITS 25-24 AND "0" | BITS 17-16 AND "0" | BITS 1-0 AND "0" |
| PPB 2 | BITS 27, 26 AND 25 | BITS 19, 18 AND 17 | BITS 3, 2 AND 1 |
| PPC 3 | BITS 29, 28 AND 27 | BITS 21, 20 AND 19 | BITS 5, 4 AND 3 |
| PPD 4 | BITS 31, 30 AND 29 | BITS 23, 22 AND 21 | BITS 7, 6 AND 5 |
| PPE 5 | BIT 31 AND SIGN (UNSIGNED BYTE) | BITS 25, 24 AND 23 | BITS 9, 8 AND 7 |
| PPF 6 | 0 | BITS 27, 26 AND 25 | BITS 11, 10 AND 9 |
| PPG 7 | 0 | BITS 29, 28 AND 27 | BITS 13, 12 AND 11 |
| PPH 8 | 0 | BITS 31, 30 AND 29 | BITS 15, 14 AND 13 |
| PPI 9 | 0 | BIT 31 AND SIGN (UNSIGNED 1/2 WORD) | BITS 17, 16 AND 15 |
| PPJ 10 | 0 | 0 | BITS 19, 18 AND 17 |
| PPK 11 | 0 | 0 | BITS 21, 20 AND 19 |
| PPL 12 | 0 | 0 | BITS 23, 22 AND 21 |
| PPM 13 | 0 | 0 | BITS 25, 24 AND 23 |
| PPN 14 | 0 | 0 | BITS 27, 26 AND 25 |
| PPO 15 | 0 | 0 | BITS 29, 28 AND 27 |
| PPP 16 | 0 | 0 | BITS 31, 30 AND 29 |
| PPQ 17 | 0 | 0 | BIT 31 AND SIGN (UNSIGNED WORD) |

| | BITS 47......32 | | EN$_x$ 3 |
| --- | --- | --- | --- |
| | BYTE MODE 422 | HALF WORD MODE 424 | FULL WORD MODE 426 |
| PPA 1 | BITS 17-16 AND "0" | BITS 17-16 AND "0" | BITS 1-0 AND "0" |
| PPB 2 | BITS 19,18 AND 17 | BITS 19, 18 AND 17 | BITS 3, 2 AND 1 |
| PPC 3 | BITS 21, 20 AND 19 | BITS 21, 20 AND 19 | BITS 5, 4 AND 3 |
| PPD 4 | BITS 23, 22 AND 21 | BITS 23, 22 AND 21 | BITS 7, 6 AND 5 |
| PPE 5 | BIT 23 AND SIGN (UNSIGNED BYTE) | BITS 25, 24 AND 23 | BITS 9, 8 AND 7 |
| PPF 6 | 0 | BITS 27, 26 AND 25 | BITS 11, 10 AND 9 |
| PPG 7 | 0 | BITS 29, 28 AND 27 | BITS 13, 12 AND 11 |
| PPH 8 | 0 | BITS 31, 30 AND 29 | BITS 15, 14 AND 13 |
| PPI 9 | 0 | BIT 31 AND SIGN (UNSIGNED 1/2 WORD) | BITS 17, 16 AND 15 |
| PPJ 10 | 0 | 0 | BITS 19, 18 AND 17 |
| PPK 11 | 0 | 0 | BITS 21, 20 AND 19 |
| PPL 12 | 0 | 0 | BITS 23, 22 AND 21 |
| PPM 13 | 0 | 0 | BITS 25, 24 AND 23 |
| PPN 14 | 0 | 0 | BITS 27, 26 AND 25 |
| PPO 15 | 0 | 0 | BITS 29, 28 AND 27 |
| PPP 16 | 0 | 0 | BITS 31, 30 AND 29 |
| PPQ 17 | 0 | 0 | BIT 31 AND SIGN (UNSIGNED WORD) |

| | BITS 31......16 | | $EN_x 2$ |
|---|---|---|---|
| | BYTE MODE 432 | HALF WORD MODE 434 | FULL WORD MODE 436 |
| PPA 1 | BITS 9-8 AND "0" | BITS 1-0 AND "0" | BITS 1-0 AND "0" |
| PPB 2 | BITS 11, 10 AND 9 | BITS 3, 2 AND 1 | BITS 3, 2 AND 1 |
| PPC 3 | BITS 13, 12 AND 11 | BITS 5, 4 AND 3 | BITS 5, 4 AND 3 |
| PPD 4 | BITS 15, 14 AND 13 | BITS 7, 6 AND 5 | BITS 7, 6 AND 5 |
| PPE 5 | BIT 15 AND SIGN (UNSIGNED BYTE) | BITS 9, 8 AND 7 | BITS 9, 8 AND 7 |
| PPF 6 | 0 | BITS 11, 10 AND 9 | BITS 11, 10 AND 9 |
| PPG 7 | 0 | BITS 13, 12 AND 11 | BITS 13, 12 AND 11 |
| PPH 8 | 0 | BITS 15, 14 AND 13 | BITS 15, 14 AND 13 |
| PPI 9 | 0 | BIT 15 AND SIGN (UNSIGNED 1/2 WORD) | BITS 17, 16 AND 15 |
| PPJ 10 | 0 | 0 | BITS 19, 18 AND 17 |
| PPK 11 | 0 | 0 | BITS 21, 20 AND 19 |
| PPL 12 | 0 | 0 | BITS 23, 22 AND 21 |
| PPM 13 | 0 | 0 | BITS 25, 24 AND 23 |
| PPN 14 | 0 | 0 | BITS 27, 26 AND 25 |
| PPO 15 | 0 | 0 | BITS 29, 28 AND 27 |
| PPP 16 | 0 | 0 | BITS 31, 30 AND 29 |
| PPQ 17 | 0 | 0 | 0 |

| | BITS 15......0 | | EN$_x$ 1 |
|---|---|---|---|
| | BYTE MODE 442 | HALF WORD MODE 444 | FULL WORD MODE 446 |
| PPA 1 | BITS 1-0 AND "0" | BITS 1-0 AND "0" | BITS 1-0 AND "0" |
| PPB 2 | BITS 3, 2 AND 1 | BITS 3, 2 AND 1 | BITS 3, 2 AND 1 |
| PPC 3 | BITS 5, 4 AND 3 | BITS 5, 4 AND 3 | BITS 5, 4 AND 3 |
| PPD 4 | BITS 7, 6 AND 5 | BITS 7, 6 AND 5 | BITS 7, 6 AND 5 |
| PPE 5 | BIT 7 AND SIGN (UNSIGNED BYTE) | BITS 9, 8 AND 7 | BITS 9, 8 AND 7 |
| PPF 6 | 0 | BITS 11, 10 AND 9 | BITS 11, 10 AND 9 |
| PPG 7 | 0 | BITS 13, 12 AND 11 | BITS 13, 12 AND 11 |
| PPH 8 | 0 | BITS 15, 14 AND 13 | BITS 15, 14 AND 13 |
| PPI 9 | 0 | 0 | 0 |
| PPJ 10 | 0 | 0 | 0 |
| PPK 11 | 0 | 0 | 0 |
| PPL 12 | 0 | 0 | 0 |
| PPM 13 | 0 | 0 | 0 |
| PPN 14 | 0 | 0 | 0 |
| PPO 15 | 0 | 0 | 0 |
| PPP 16 | 0 | 0 | 0 |
| PPQ 17 | 0 | 0 | 0 |

FIGURE 7D

HIGH PERFORMANCE UNIVERSAL MULTIPLIER CIRCUIT

BACKGROUND OF THE INVENTION

1. Field of the Invention

The present invention relates to the field of hardware used for implementing arithmetic operations such as processor instructions. More specifically, the present invention relates to a multiplier circuit capable of performing operations on operands of various data types and also for signed and non-signed binary values.

2. Related Art

Hardware multipliers are an indispensable component of every computer system, cellular phone and most digital audio/video equipment. In real-time applications (e.g., flight simulators, speech recognition, video teleconferencing, computer games, streaming audio/video etc.), the overall system performance is heavily dependent on the speed of the internal multipliers. For instance, processing digital images at 30 frames/second requires nearly 2.2 million multiply operations per second. Therefore, designing fast multipliers that occupy smaller areas on the integrated circuit (IC) chip and that consume less power is essential to a successful product.

In multimedia applications, multipliers are used to perform a wide range of functions such as Inverse Discrete Cosine (IDCT), Fast Fourier Transforms (FFT), and Multiply Accumulate (MAC) on 8-bit, 16-bit, and 32-bit signed and unsigned operands. It would be advantageous to provide a multiplier device which can support a variety of data formats. One effort to produce a multiplier that can support a variety of data formats resulted in multi-cycle multipliers.

FIG. 1 illustrates the operation 10 of a multi-cycle multiplier of the prior art. In the multi-cycle multiplier, a smaller multiplier circuit (e.g., 8×8 bit) is used to compute partial products (e.g., step 12) which are accumulated together (e.g., step 14) to form the final result. The multi-cycle or "iterative" method uses a basic multiplier to perform the multiplication for larger word lengths. This method does not allow high throughput for large word lengths, and although it may result in a shorter delay for 8-bit operations, the extra cycles to perform 16-bit and 32-bit operations result in serious side effects such as longer delay, more wiring, bypassing, and unwanted stalls in the pipeline. Table I shows the number of clock cycles needed for partial product reduction using a typical 8×8 bit multiplier circuit for performing 8-bit, 16-bit, and 32-bit multiplications.

TABLE 1

| Operand Size | Necessary Number of Cycles (also called Cycle Latency) |
| --- | --- |
| 8-bit | 1 cycle |
| 16-bit | 2 cycles |
| 32-bit | 4 cycles |

As discussed above, there are numerous disadvantageous with the prior art multi-cycle multiplier approach, such as, larger cycle latency, smaller throughput, and perhaps worst of all, different timing delays for different data formats, which would result in creating stalls in the pipeline when dealing with wider numbers.

Recently, Hideyuki proposed in a reference entitled, "Matrix Vector Multiplier (MVM) Dedicated to Video Decoding and 3-D Computer Graphics," by Hideyuki et., al., IEEE Transactions on Circuits and Systems for Video Technology, Volume: 9,2, March 1999, pages 306–314, the matrix vector multiplier (MVM) dedicated to video decoding and 3-D computer graphics. This multiplier supports multiple operations on 16-bit and 32-bit unsigned operands using only one multiplier, at the cost of a very low speed 20 MHz. Like other multipliers using the iterative method, many extra cycles are required to perform the 32-bit multiply operations which reduces the overall performance of this device. It would be advantageous to provide a multiplier circuit design that could support a variety of data formats (e.g., lengths) without consuming extra cycles for multiply operations on larger operands.

An Intel design is described in a reference entitled, "A 600 MHz IA-32 Microprocessor with Enhanced Data Streaming for Graphics and Video," by Stephen Fischer, Digest of Technical Papers, ISSCC 1999, pages 98–450. In this design approach, two separate hardware multipliers are used to perform two 16×16 bit multiplications. Since these multipliers are not partitioned, this approach does not allow the flexibility to use these multipliers for a variety of data formats and the duplication of circuitry consumes large amounts of area and consumes large amounts of power. Moreover, extra cycles are required to perform 32-bit operations because the iterative method is required for operands larger than 16-bits. Lastly, this design does not allow much parallelism for 8-bit operations.

The second prior art method for performing multiplication that supports a variety of data formats uses separate hardware for different data types. For instance, a separate 32×32 bit multiplier circuit, a separate 16×16 bit multiplier circuit and a separate 8×8 bit multiplier circuit are included within a single multiplier device. However, using separate hardware for different data types can become extremely costly because it requires large amounts of chip area and consumes more power.

An AltiVec design by Motorola is described in a paper entitled, "A Low Power, High Speed Implementation of a PowerPC Microprocessor Vector Extension," by Martin S. Schmookler et. al., presented at 14th IEEE Symposium on Computer Arithmetic, 1999. This is the first architecture which supports multiplication on 8-bit and 16-bit signed and unsigned operands. However, like the Intel design described above, this prior art design uses redundant/separate hardware for performing 8-bit and 16-bit multiplications. It would be advantageous to provide a multiplier circuit design that could support a variety of data formats without consuming large amounts of area and power.

SUMMARY OF THE INVENTION

Accordingly, the present invention provides a multiplier design that accepts a large variety of data formats but does not require iterative steps (e.g., multi-cycling) to perform large operand multiplication thereby providing very fast operational performance. The present invention advantageously provides constant cycle latency for any operand size from 8-bit, 16-bit and 32-bit and does not perform multiplier multi-cycling for larger operands. Further, the present invention provides a multiplier design that accepts a large variety of data formats but does not utilize multiplier circuitry duplication thereby providing a hardware efficient and energy efficient device.

A partitioned multiplier circuit is described herein which is designed for high speed operations. The multiplier of the present invention can perform one 32×32 bit multiplication, two 16×16 bit multiplications (simultaneously) or four 8×8 bit multiplications (simultaneously) depending on input partitioning signals. The time required to perform either the 32×32 bit or the 16×16 bit or the 8×8 bit multiplications is the same due to the design of the present invention. Multiplication results are available with a constant latency (e.g., two clock cycles in one embodiment) regardless of the operand bit-size. In the embodiment that requires two clock cycle latency, the multiplier circuit has a throughput of one clock cycle due to pipelining. The input operands can be signed or unsigned. The hardware is partitioned without any significant increase in the delay or area and the multiplier can provide six different modes of operation. In one embodiment, Booth encoding is used for the generation of 17 partial products which are compressed using a compression tree into two 64-bit values. This is performed in the first pipeline stage to generate a 64-bit sum vector and a 64-bit carry vector. These values are then added, in the second pipestage, using a carry propagate adder circuit to provide a single 64-bit result. In the case of 16×16 bit multiplication, the 64-bit result contains two 32-bit results. In the case of 8×8 bit multiplication, the 64-bit result contains four 16-bit results. Due to its high operating speed, the multiplier circuit is advantageous for use in multi-media applications, such as audio/visual rendering and playback.

More specifically, an embodiment of the present invention includes a partitioned multiplier comprising: a sign extension and partitioning circuit receiving a 32-bit multiplicand and producing a 64-bit extended multiplicand; a booth encoder and selector circuit receiving the 64-bit extended multiplicand and receiving a 32-bit multiplier, the booth encoder and selector circuit simultaneously generating 17 partial products properly partitioned for performing byte, half-word (16-bit) and word (32-bit) multiply operations based on a partition signal, wherein partial products 6–17 are zero for the byte multiply operations and wherein partial products 10–17 are zero for the half-word multiply operations; a compressor tree receiving the 17 partial products and generating therefrom a sum vector and a carry vector; and an adder circuit adding the sum and the carry vectors and producing a 64-bit output, wherein the 64-bit output is generated with two cycle latency and single cycle throughput for each of the byte, half-word and word multiply operations.

Embodiments include the above and wherein the multiplicand and the multiplier each comprise four 8-bit operands, the multiplier simultaneously performing four 8×8 bit multiply operations and wherein the 2n-bit output comprises four 16-bit results. Embodiments include the above and wherein the multiplicand and the multiplier each comprise two 16-bit operands, the multiplier simultaneously performing two 16×16 bit multiply operations and wherein the 2n-bit output comprises two 32-bit results. Embodiments include the above and wherein the multiplicand and the multiplier each comprise one 32-bit operand, the partitioned multiplier performing one 32×32 bit multiply operation and wherein the 64-bit output comprises one 64-bit result.

BRIEF DESCRIPTION OF THE DRAWINGS

FIG. 2B is a mapping of Booth-encoded partial products of the 32×32 bit multiplier partitioned into two 16×16 bit multipliers in accordance with one embodiment of the present invention.

FIG. 6B, FIG. 6C and FIG. 6D illustrate partial product generation for byte, half-word and word operations, respectively.

FIG. 7A illustrates a mapping of sign bit signals and bits of the multiplier that are used by Booth encoders of the present invention to control the multiplier select lines of the partial product computation circuits for bits 63 . . . 48 of the partial products (PPa–PPq) for each partition mode.

FIG. 7B illustrates a mapping of sign bit signals and bits of the multiplier that are used by Booth encoders of the present invention to control the multiplier select lines of the partial product computation circuits for bits 47 . . . 32 of the partial products (PPa–PPq) for each partition mode.

FIG. 7C illustrates a mapping of sign bit signals and bits of the multiplier that are used by Booth encoders of the present invention to control the multiplier select lines of the partial product computation circuits for bits 31 . . . 16 of the partial products (PPa–PPq) for each partition mode.

FIG. 7D illustrates a mapping of sign bit signals and bits of the multiplier that are used by Booth encoders of the present invention to control the multiplier select lines of the partial product computation circuits for bits 15 . . . 0 of the partial products (PPa–PPq) for each partition mode.

DETAILED DESCRIPTION OF THE INVENTION

Figure 1:
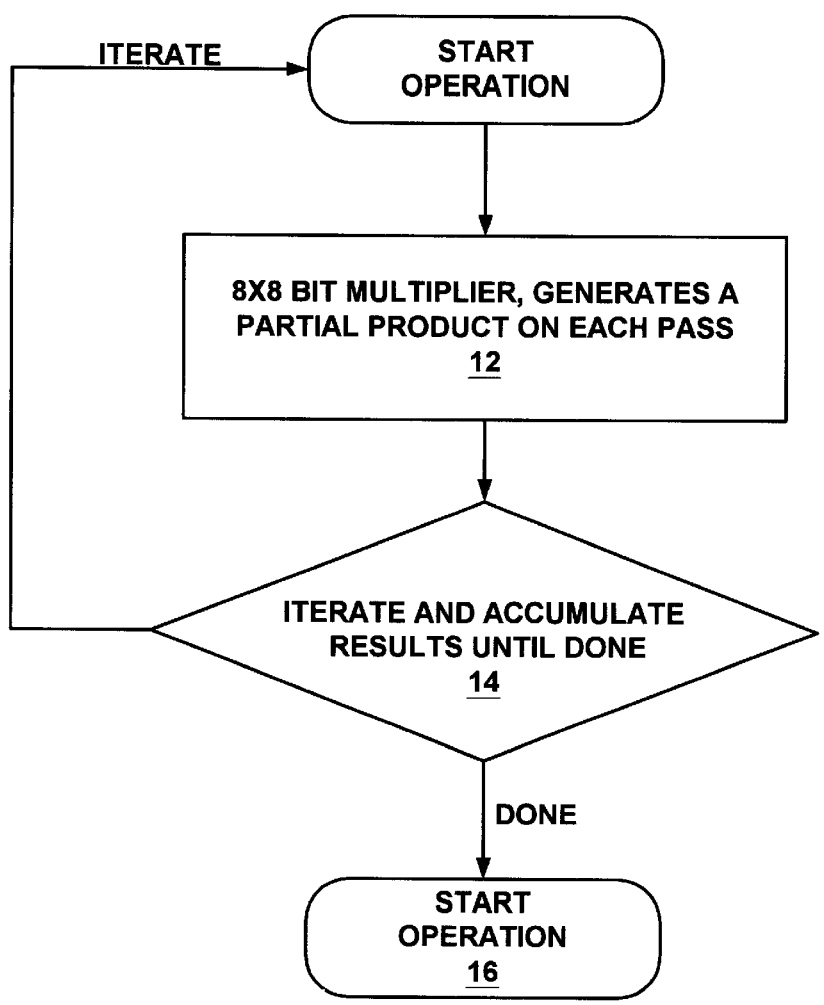
FIG. 1 is a flow diagram of the operation of a prior art multiplier design.

In the following detailed description of the present invention, a high performance universal, partitioned, 32–32 bit multiplier circuit, numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail as not to unnecessarily obscure aspects of the present invention.

The present invention is drawn to a partitionable multiplier (e.g., one that can handle inputs with various data sizes and formats). The multiplier circuit is optimized for speed and area with the targeted speed being 200 MHz, in one embodiment, which supports high-end multimedia applications. The single multiplier circuit of the present invention can perform one 32-bit by 32-bit multiplication, or two 16-bit by 16-bit multiplications, or four 8-bit by 8-bit multiplications simultaneously on signed and unsigned operands with single cycle throughput and constant latency (e.g., two cycles in one embodiment). This gives maximum flexibility in using the multiplier for variety of applications. The multiplier of the present invention can be used in a wide variety of applications, for instance, it can be used in floating point multiplication, in SIMD multimedia applications to support multiple multiplications in parallel and for multimedia applications. The reconfigurability of the multiplier is achieved using three control signals. Two of the three signals are used to partition the single multiplier circuit into 32-bit, 16-bit, or 8-bit independent multipliers and the third control signal is used to control the signed/unsigned operation.

Although the preferred embodiment is described with respect to a multiplier circuit having a constant two cycle latency, it is appreciated that the present invention can be implemented having a single cycle latency as process technology and circuit speed improves. In this case, the multiplier has only a single stage.

The preferred embodiment of the multiplier is based on the Booth-2 process, although other embodiments can be implemented using Booth-3 and Booth-4 encoding. In order to meet the high throughput demand, the multiplier is divided into two pipeline stages. In the first stage, all the partial products are added to produce sum and carry vectors. The sum and carry vectors are then added using a carry propagate adder in the second stage. In the second stage, rounding and saturation of the results is also performed. This approach makes the pipelines well balanced and requires less area.

The present invention presents a novel method to use the single multiplier hardware efficiently without increasing the delay or area to implement a multiplier that support 8-bit, 16-bit, and 32-bit multiplications simultaneously which can perform: 1) four 8-bit by 8-bit partitioned multiplications, or 2) two 16-bit by 16-bit partitioned multiplications, or 3) one 32-bit by 32-bit multiplication. The device creates a high degree of flexibility, e.g., a single 32×32 multiplier can work as a 32×32 multiplier, two 16×16 multipliers, or four 8×8 multipliers, with the same latency and throughput in all cases. Therefore, this method and circuit of the present invention are ideally suited for pipelined datapaths.

Partial Product Generation

Figure 2A:
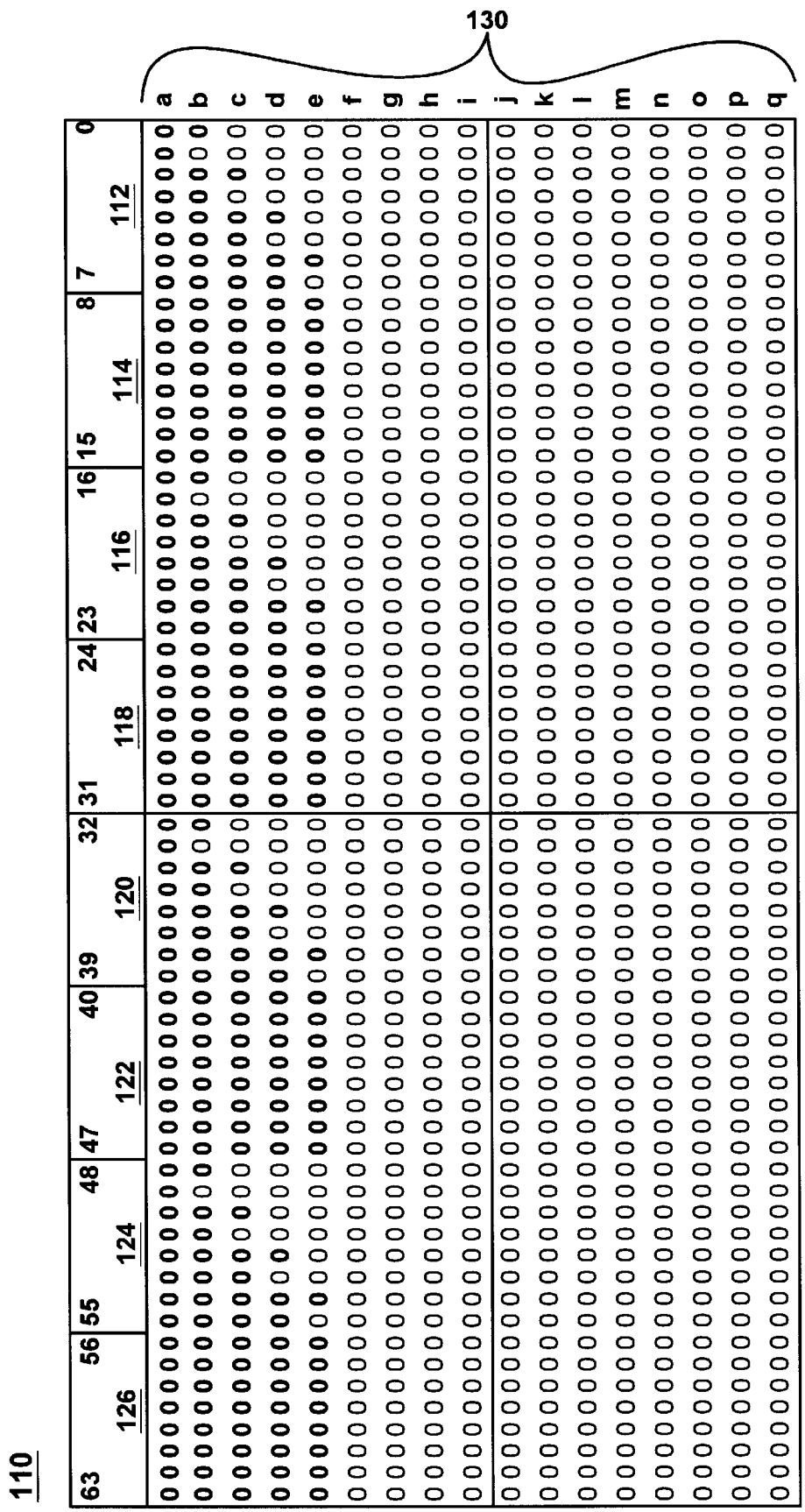
FIG. 2A is a mapping of Booth-encoded partial products of a 32×32 bit multiplier partitioned into four 8×8 bit multipliers in accordance with one embodiment of the present invention.

The multiplier circuit of the present invention provides a single 32×32 bit multiplier circuit that can be partitioned to support a single 32×32 bit operation, two 16×16 bit operations or four 8×8 bit operations. The present invention also utilizes Booth encoding to perform the multiplication steps and therefore partial products are generated according to the Booth encoding process. In Booth encoding, different numbers of partial products are generated depending on the partitioning of the multiplier. An 8×8 bit multiplication requires only 5 partial products using Booth encoding for unsigned numbers and 4 for signed, a 16×16 bit multiplication requires 9 partial products for unsigned numbers and 8 for signed, and 32×32 bit multiplication requires 17 partial products for unsigned numbers and 16 for signed. In each case, the multiplier of the present invention generates 17 partial products. Therefore, the unused partial products are set to zero in case of 16-bit and 8-bit operations. As shown in FIG. 2A, an unsigned byte operation requires only five partial products PP(a, b, c, d, and e), thus in order to get the correct result, the rest of the partial products PP(f, g, h, i, j, j, l, m, n, o, p, and q) are set to zero. Similarly, in case of half-word operation (FIG. 2B) partial products PP(j, k, l, m, n, o, p and q) are set to zero.

The Booth encoding process is good for signed numbers but in order to deal with unsigned numbers it needs the addition of one more partial product. Therefore the generation of this partial product and its proper positioning for byte, half-word, and word cases is required for designing a signed/unsigned partitioned multiplier.

FIG. 2A illustrates a partial product mapping 110 used when the multiplier circuit of the present invention is partitioned to generate four 8×8 bit multiply operations. The mapping 110 illustrates all 64 bits of each of the 17 total partial products, PPa–PPq (also 130*a*–130*q*). Bit sections 112–126 represent eight bit sections of each partial product. In this case, only five partial products are required (e.g., n/2+1 where n=8). Therefore, only partial products PPa–PPe are used and the remainder (e.g., partial products PPf through PPq) are zero, as represented by the unshaded bubbles. Each darkened bubble represents a bit of a partial product that can be non-zero and is either: 1) a representation of the multiplicand as processed by the Booth encoding method, e.g., multiplied by 0, 1, 2, –1, or –2; or 2) a "1" added to account for negative values in 2's complement.

Figure 2B:
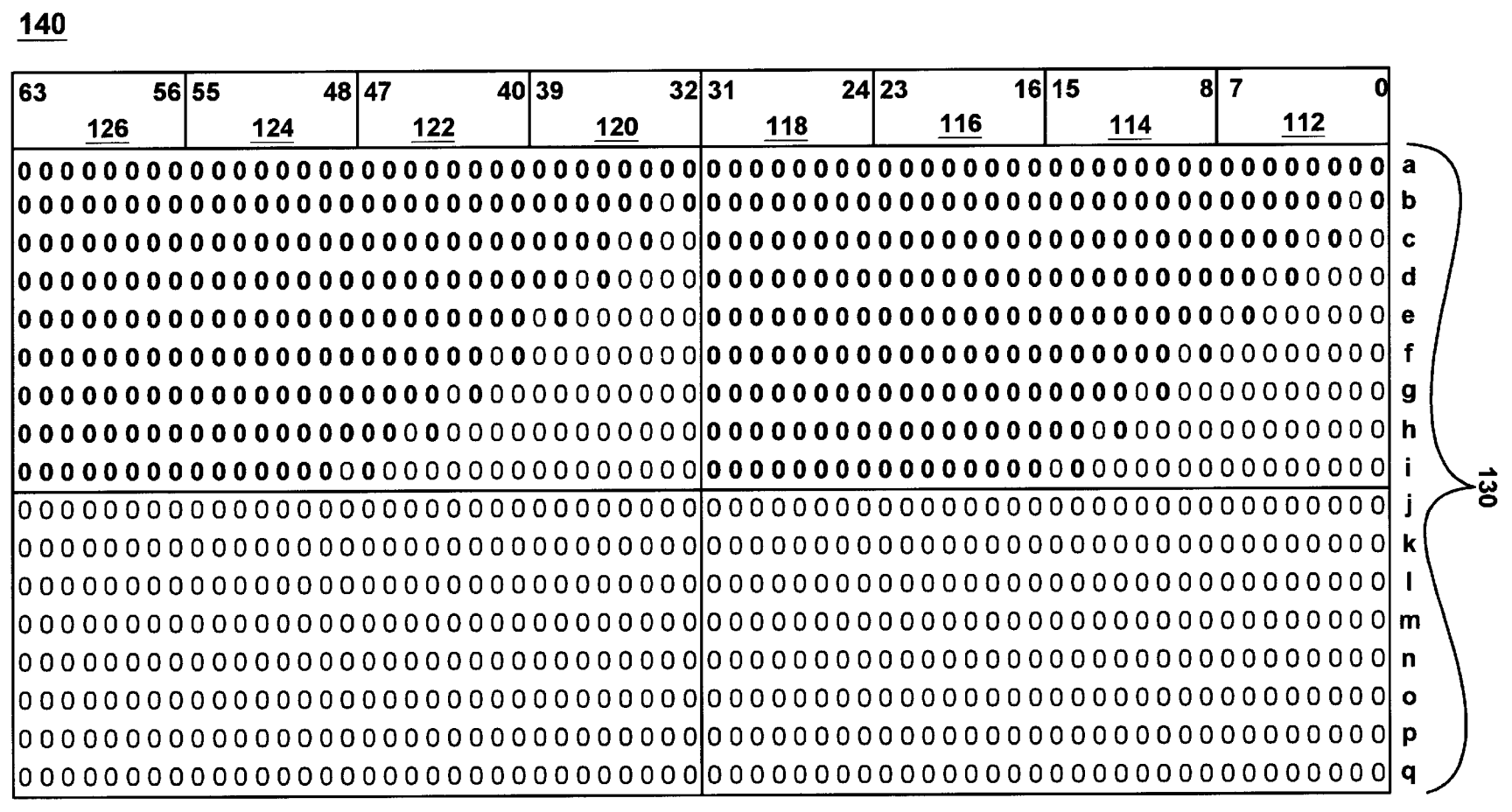

FIG. 2B illustrates an unsigned partial product mapping 140 used when the multiplier circuit is partitioned to generate two 16×16 bit multiply operations. The mapping 140 illustrates all 64 bits of each of the 17 total partial products, PPa–PPq. In this case, only 9 partial products are required (e.g., n/2+1 where n=16). Therefore, only partial products PPa–PPi are used and the remainder (e.g., partial products PPj through PPq) are zero, as represented by the unshaded bubbles. As above, each darkened bubble represents a bit of a partial product that can be non-zero. It is appreciated that the signed mapping includes only 8 total partial products.

Figure 2C:
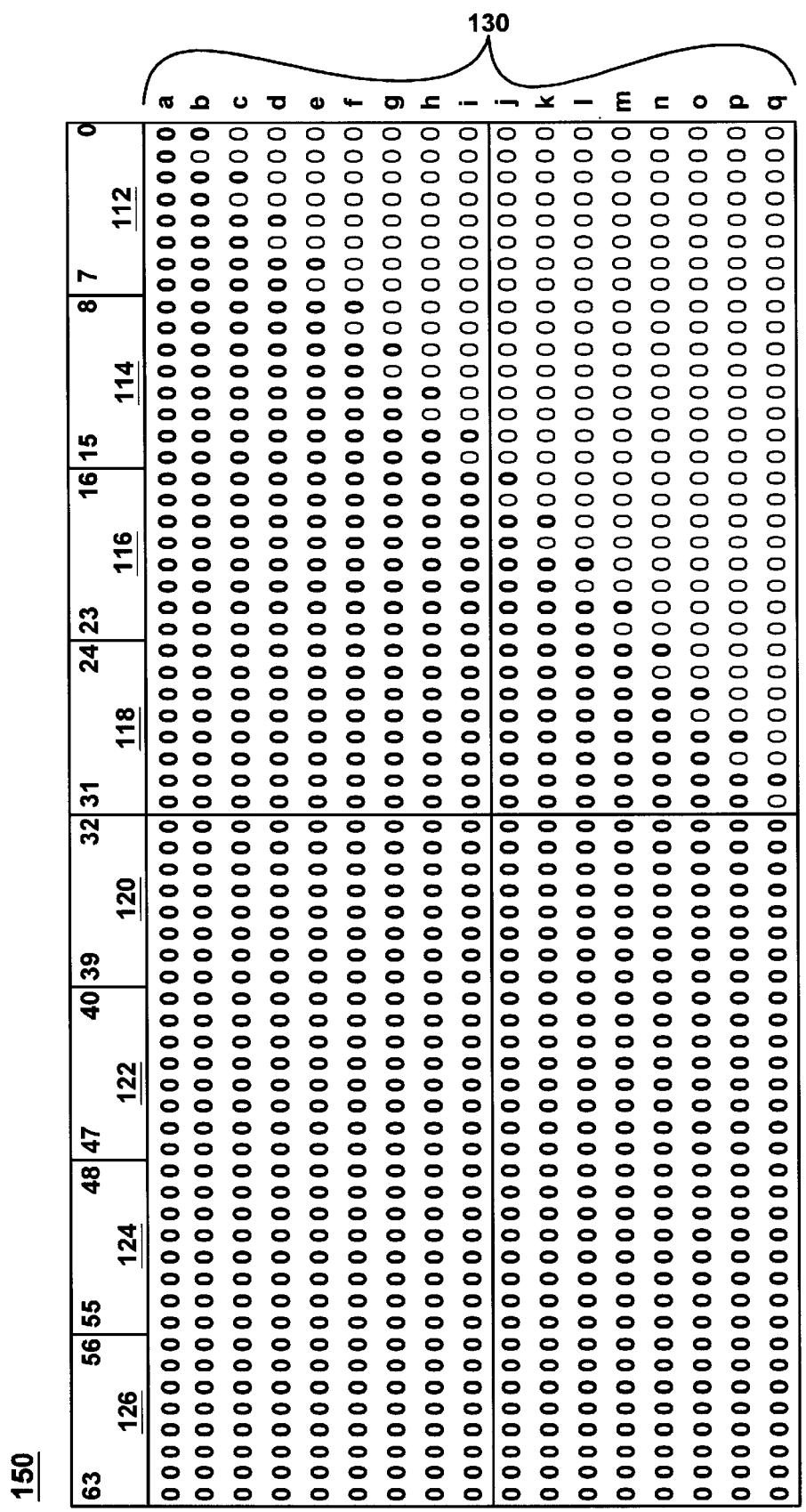
FIG. 2C is a mapping of Booth-encoded partial products of the 32×32 bit multiplier partitioned into a single 32×32 bit multiplier in accordance with one embodiment of the present invention.

Lastly, FIG. 2C illustrates an unsigned partial product mapping 150 used when the multiplier circuit is partitioned to generate one 32×32 bit multiply operation. The mapping 150 illustrates all 64 bits of each of the 17 total partial products, PPa–PPq. In this case, all 17 partial products are required (e.g., n/2+1 where n=32). Therefore, the only zeroed portion of the partial products lie to the right of the partial products PPc–PPq and result from the left shift of the multiply operation. As above, each darkened bubble represents a bit of a partial product that can be non-zero. As described further below, the multiplier circuit of the present invention contains circuitry for generating the proper partial products based on the selected mode of operation, e.g., byte, word or half-word. It is appreciated that the signed mapping includes only 16 total partial products.

The mappings of FIGS. 2A–2C also illustrate the proper positioning of 1's for negative partial products in accordance with the Booth encoding process. The Booth encoding method generates negative partial products (−1× and −2×) which require the addition of 1's at proper bit positions as required for 2's complement notation. If a partial product is negative, its corresponding "1" is inserted into the next partial product. As shown in FIGS. 2A–2C, this bit position moves with the partial products and the partition. For example, in case of byte operations, a one (zero) needs to be added at bit position 16 (of PPb) if the second operand of the first partial product (PPa) is negative (positive), while in case of half-word or word operations, this bit position represents the input data. In general, 1's can be added into the partial products at each location of the mappings 110–150 where a bubble (e.g., bit position) is darkened and the position immediately to the left is not darkened. The "1" is added to account for a negative the partial product directly above the darkened bubble. Therefore, proper positioning of these 1's and their control signals is required to properly partition a 32-bit multiplier into 16-bit and 8-bit multipliers.

Zeros also need to be padded within the partial products PPa–PPq to account for the shift in position of the partial products. As shown in FIGS. 2A–2C, at the right side of each partial product zeros (e.g., non darkened bubbles) are padded to represent left shifting of the partial product similar to pencil-and-paper multiplication. The number and position of these zeros change with the partial products and the partition. For example, in case of a byte operation as shown in FIG. 2A, a zero needs to be padded at bit positions 1, 17, 33, and 49 in the second partial product, PPb, while in case of half-word or word operation (FIGS. 2B and 2C), the bit positions 17 and 49 of PPb represent the input data (and are darkened). Similarly, the number of padded zeros increases as the partial products near the last partial product, PPq. Therefore, proper positioning and alignment of these 0's is required to partition a 32-bit multiplier into 16-bit and 8-bit multipliers.

Universal Multiplier Design

Figure 3:
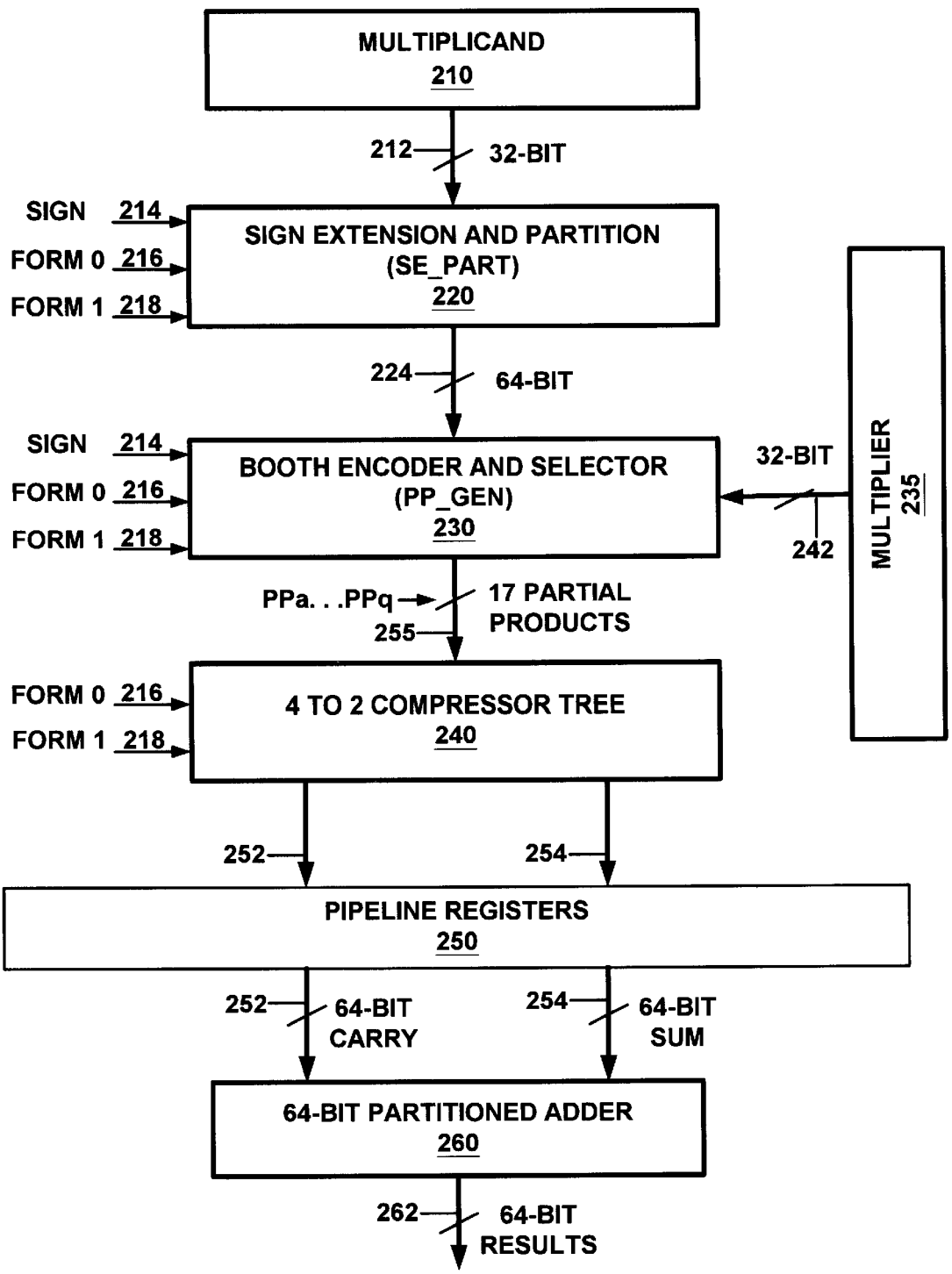
FIG. 3 is a logical block diagram of the high performance universal multiplier design of the present invention.

FIG. 3 illustrates a circuit block diagram of the preferred embodiment of the high speed universal multiplier 200 of the present invention. Circuit 200 offers a constant latency (e.g., two clock cycles in this embodiment) single 32×32-bit partitioned multiplier (although the techniques utilized in the present invention could be extended to larger multi-bit operands) that can be partitioned to perform one 32×32-bit operation, two simultaneous 16×16-bit operations or four simultaneous 8×8-bit operations. In either multiplication format, the multiplier 200 offers constant latency and does not operate using multi-cycle multiplication for larger bit-sized operands.

The multiplier circuit 200 is based on a modified Booth process which includes Booth encoder circuits as described in co-pending United States Patent Application entitled, "Multiplier Circuit Having Optimized Booth Encoder/Selector," filed on Mar. 29, 1999, Ser. No. 09/280,176 by Chehrazi, Oklobdzija and Farooqui, which is incorporated herein by reference. The multiplier circuit 200 of the present invention includes a sign extension and partitioning (SEP) circuit 220 for sign extending and partitioning the multiplicand, a modified Booth encoder and selector (BES) circuit 230 for generating 17 partial products, a 4 to 2 compressor tree circuit 240 for adding the 17 partial products, and a 64-bit final carry propagate adder (CPA) circuit 260. The CPA circuit 260 is described in co-pending United States Patent Application entitled, "A Multiplexer-Based Parallel N-Bit Adder Circuit for High Speed Processing," filed on Mar. 23, 1999, Ser. No. 09/275,068, by Chehrazi, Oklobdzija and Farooqui, which is incorporated herein by reference.

In order to meet the high throughput demand, the preferred embodiment of the multiplier circuit 200 has been divided into two pipeline stages, however, a single stage circuit is envisioned as process technology and speed improves. The (SEP) circuit 220, the (BES) circuit 230, and 4 to 2 compressor circuit 240 form the first pipeline stage of the multiplier circuit 200. The CPA circuit 260 then forms the second stage of the multiplier circuit 200.

The inputs to the multiplier circuit 200 are a 32-bit multiplicand (A) 210, a 32-bit multiplier (B) 235, a sign signal 214, and two partition signals form0 (f0) 216 and form 1 (f1) 218. The bits of the 32-bit multiplicand operand are carried over 32-bit bus 212 and the bits of the 32-bit multiplier operand are carried over the 32-bit bus 242. The operation of the multiplier circuit 200 based on sign, and format signals is summarized in the exemplary Table II below. It is appreciated that other signal assignments can also be implemented within the present invention.

TABLE II

Function of Sign, Form0, and Form1 signals

| Sign | F1 | F0 | Operation |
|---|---|---|---|
| 0 | 0 | 0 | Undefined |
| 0 | 0 | 1 | Unsigned Byte |
| 0 | 1 | 0 | Unsigned Half-Word |
| 0 | 1 | 1 | Unsigned Word |
| 1 | 0 | 0 | Undefined |
| 1 | 0 | 1 | Signed Byte |
| 1 | 1 | 0 | Signed Half-Word |
| 1 | 1 | 1 | Signed Word |

When the format signals (f0 and f1) are '00,' the multiplier operation is undefined. If f1 and f0 are '01,' then the multiplier circuit 200 performs four 8×8 (byte) multiplications on the input operands. In this case, the byte operands are obtained from four designated portions each of the 32-bit multiplicand 210 and the 32-bit multiplier 235. The results are four 16-bit products which are represented in the 64-bit bus 262. Similarly, when f1 and f0 are '10,' then the multiplier performs two 16×16 (half-word) multiplications. In this case, the half-word operands are obtained from two designated portions each of the 32-bit multiplicand 210 and the 32-bit multiplier 235. The results are two 32-bit products which are represented in the 64-bit bus 262. When f1 and f0 are '11,' then the multiplier performs one 32×32 (word) multiplication. The results is one 64-bit product which is represented in the 64-bit bus 262. The sign signal controls the sign or unsigned operation of the multiplier 200, this signal is 1(0) for signed (unsigned) operations.

The form0 signal 216 and the form1 signal 218 of FIG. 3 are fed to the SEP circuit 220, the BES circuit 230 and the compressor tree circuit 240. The sign signal 214 is also fed to the SEP circuit 220 and the BES circuit 230. The SEP circuit 220 receives the 32-bit multiplicand over bus 212 and generates a 64-bit output over bus 224 which is partitioned (based on the f0 and f1 signals) and sign extended based on the sign signal 214. The sign extended and partitioned multiplicand signal over 64-bit bus 224 is fed to the BES circuit 230. The BES circuit 230 also receives the 32-bit multiplier over bus 242 and simultaneously generates 17 separate 64-bit partial products, PPa–PPq, over 17 separate 64-bit buses called 255.

These 17 partial products are compressed by the 4 to 2 compressor circuit 240 into a 64 bit carry value 252 and a 64-bit sum value 254. The sum value and the carry values are stored into pipeline registers 250. The sum value and the carry values are then added by CPA circuit 260 to produce a 64-bit result over bus 262. As described above, the multiplier circuit 200 of the present invention has a single cycle throughput, due to pipelining, and a two cycle latency for byte, half-word and word operations. With single cycle throughput, one 32×32 bit multiplication can be performed, or two simultaneous 16×16 bit multiplications can be performed, or four simultaneous 8×8 bit multiplications can be performed.

The SEP Circuit 220

Figure 4:
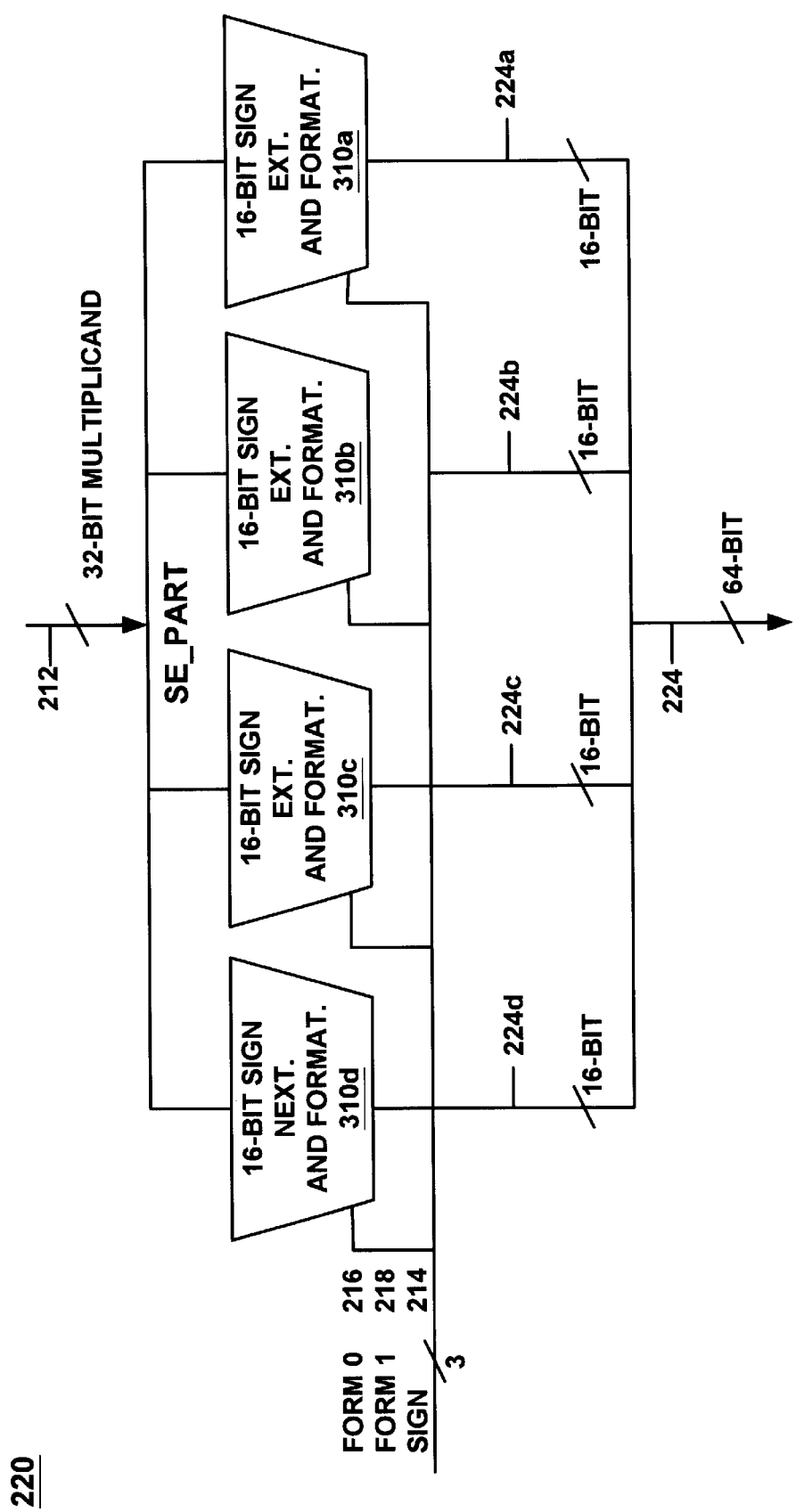
FIG. 4 is a schematic diagram of the sign extension and partition (SEP) circuit block of the high performance universal multiplier design of one embodiment of the present invention.

FIG. 4 illustrates a circuit diagram of the SEP circuit 220 in accordance with one embodiment of the present invention. The SEP circuit 220 is the first block of the multiplier. This block is responsible for the proper sign extension, partitioning, and alignment of the input operands. The SEP circuit 220 acts to properly align the bits of the multiplicand depending on the selected mode of operation of the multiplier circuit 200. The inputs to this block are 32-bit multiplicand 212, format 216 and 218 and sign 214 signals. The output of the SEP circuit 220 is 64-bit, partitioned and signed extended multiplicand 224 according to the format and sign signals.

Figure 5A:
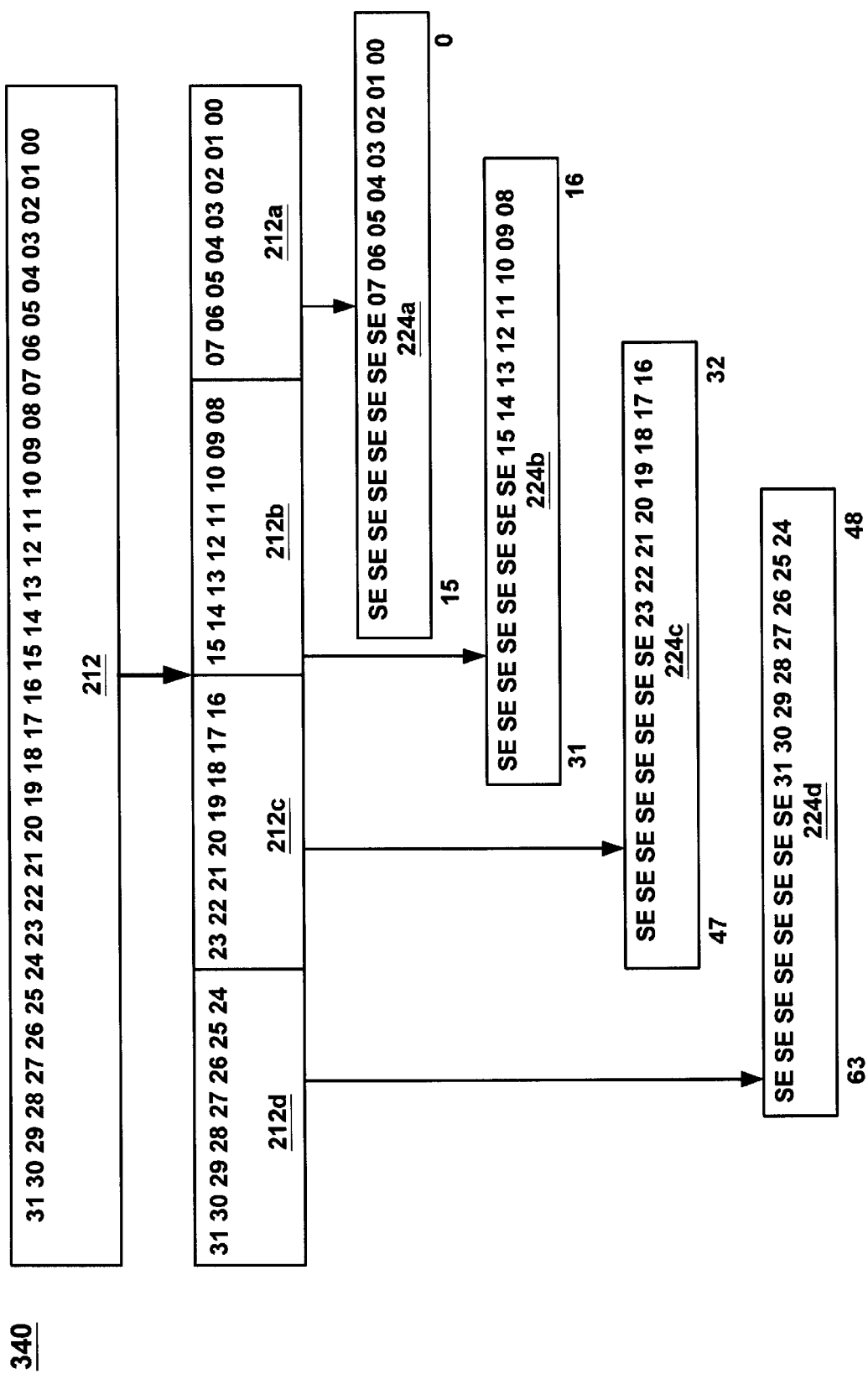
FIG. 5A is an illustration of the transformation performed by the sign extension and partition circuit block of the present invention for supporting four 8×8 bit multiplication operations using a 32×32 bit multiplier circuit.
Figure 5B:
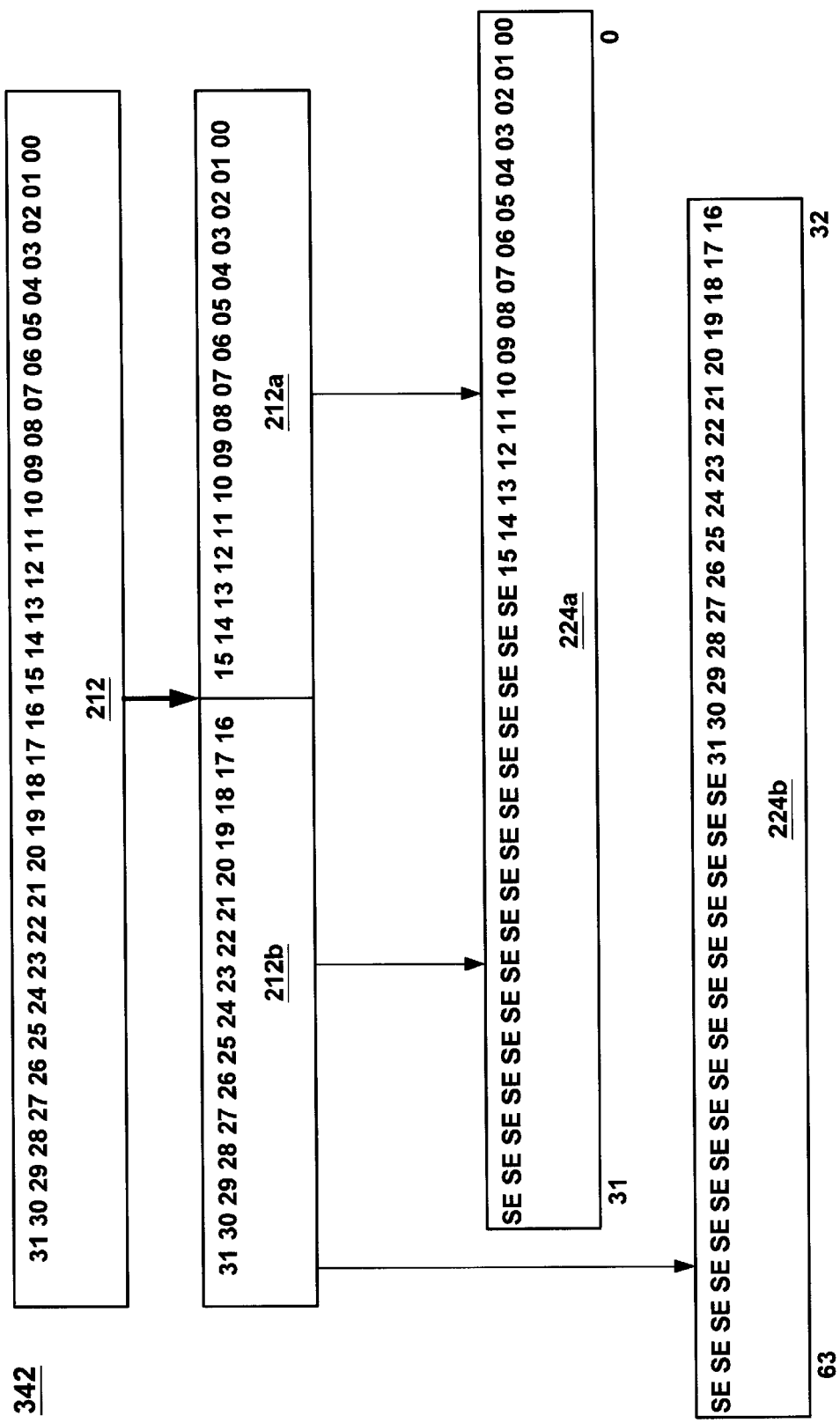
FIG. 5B is an illustration of the transformation performed by the sign extension and partition circuit block of the present invention for supporting two 16×16 bit multiplication operations using a 32×32 bit multiplier circuit.
Figure 5C:
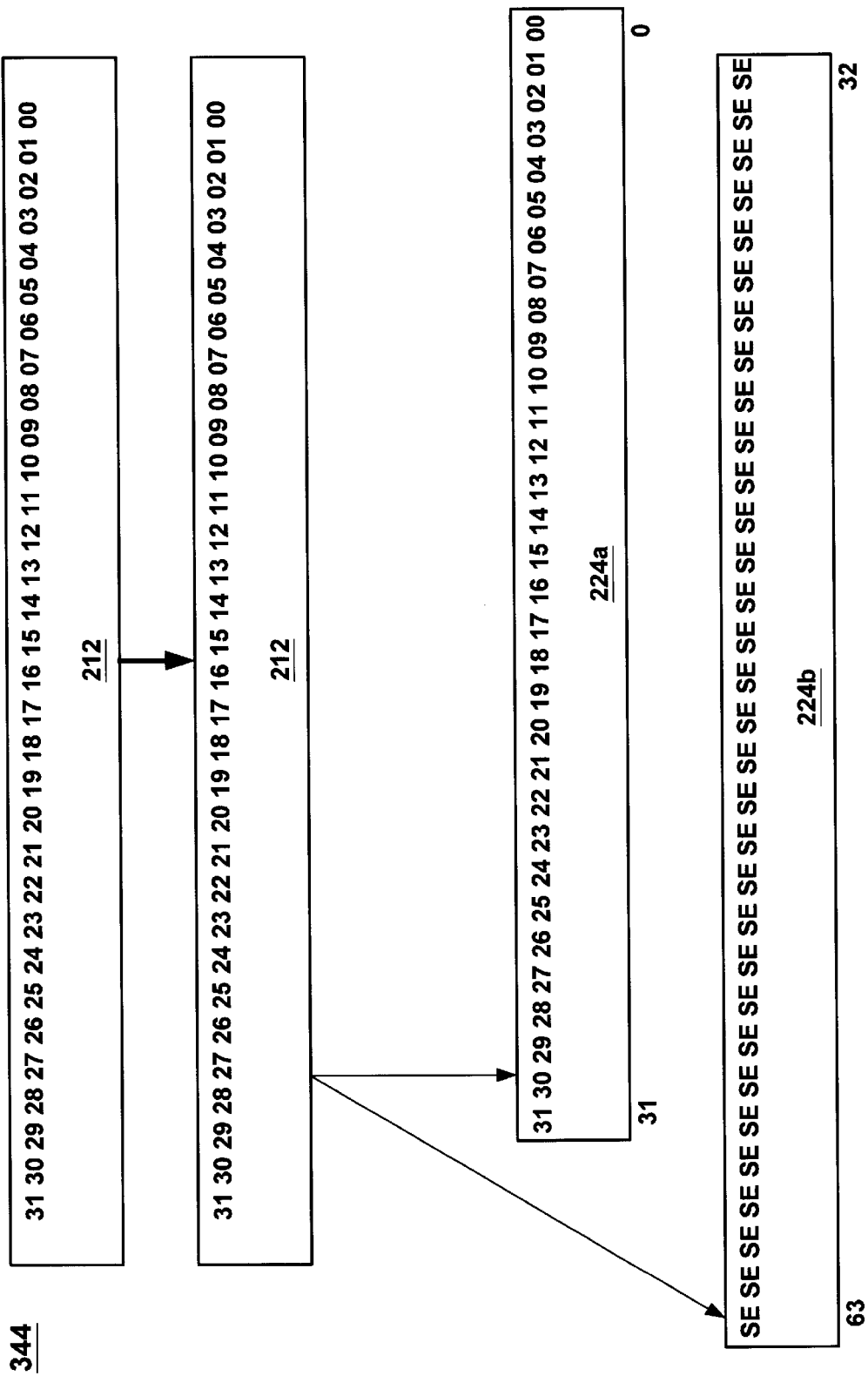
FIG. 5C is an illustration of the transformation performed by the sign extension and partition circuit block of the present invention for supporting one 32×32 bit multiplication operation using a 32×32 bit multiplier circuit.

The 32-bit multiplicand is received over bus 212 into the inputs of four 16-bit sign extension and formatting circuits 310a–310d which each receive the format signals f1 218 and f0 216 and also receive the sign signal 214. Each 16-bit sign extension and formatting circuit (a 3:1 multiplexer) generates a separate 16-bit output 224a–224d which together comprise the 64-bit output bus 224. FIGS. 5A, 5B and 5C illustrate the outputs of the SEP circuit 220 based on byte, half-word and word modes of operation of multiplier circuit 200. If the sign signal 214 is "0" then the sign extension, SE, value is zero. If the sign signal 214 is "1" then SE is the most significant bit (MSB) of each binary value (e.g., byte, word or half-word).

One issue in partitioning a multiplier circuit for different data types is different representations of the input. The SEP circuit 220 solves this problem by performing input alignment depending on the partition mode signals (fo and f1). The 32-bit input operands can represent as many as three different values for 8, 16, and 32-bit operations. As shown in FIG. 5A, in the case of byte operations, the 32-bit input multiplicand 212 represents 4 separate inputs 212a–212d of 8-bits each, bits 0–7 form the first input, bits 8–15 form the second input, and so on. Similarly, as shown in FIG. 5B, in the case of half-word operations the 32-bit input multiplicand 212 represents 2 separate inputs 212a–212b of 16-bit each, bits 0–15 form the first input, and bits 16–31 form the second input. As shown in FIG. 5C, in the case of 32-bit operations, the bits 0–31 of the multiplicand 212 represent only one input.

A second issue in designing a universal partitioned multiplier is the sign extension of the inputs and the partial products for handling signed numbers and negative partial products, respectively. The SEP circuit 220 solves this problem by performing sign extension. Once the inputs are aligned, then the sign of the input multiplicand 212 needs to be extended to the maximum. For example, in case of byte operations, the sign of first, second, third, and fourth inputs needs to be extended from 8 to 15, 24 to 31, 40 to 47, and 56 to 63 respectively (as shown in FIG. 5A), similarly in case of half-word operations, the signs of the first and second inputs need to be extended from 16 to 31, and 48 to 63, respectively (as shown in FIG. 5B). While in case of word operations, the sign of the input is extended from 32 to 63 (as shown in FIG. 5C).

Due to the difference in the representation of the inputs, different mappings of the input to the multiplier circuit are required. The three cases of operation of the SEP circuit 220 are explained below with reference to FIG. 5A, FIG. 5B and FIG. 5C.

Byte (Form 1, Form 0,=01) FIG. 5A illustrates a chart 340 of the byte mode of operation. If byte operation is required then the multiplicand 212 is first partitioned into four 8-bit blocks and then sign-extended to 16-bits to produce a 64-bit output. In case of unsigned operands, the SE bits are set to '0,' while in case of signed operands these bits are set to the value of the most significant bit of the partitioned multiplicand. In a 32-bit partitioned multiplier with 32-bit multiplicand sign extended to 64-bit, during byte operations input bits 0–7 of bus 212 are mapped to bits 0–7 of bus 224, bits 8–15 of bus 212 are mapped to bits 16–23 of bus 224, bits 16–23 of bus 212 are mapped to bits 32–40 of bus 224 and bits 24–31 of bus 212 are mapped to bits 48–63 of bus 224. In FIG. 5A, each byte is sign extended with bits 15 to 0 of bus 224 comprising eight sign extensions, SE, followed by bits 7 through 0 of the multiplicand 212. Bits 31 to 16 of bus 224 comprise eight sign extensions, SE, followed by bits 15 through 8 of the multiplicand 212. Bits 47 to 32 of bus 224 comprise eight sign extensions, SE, followed by bits 23 through 16 of the multiplicand 212. Lastly, bits 63 to 48 of bus 224 comprise eight sign extensions, SE, followed by bits 31 through 24 of the multiplicand 212. As discussed, SE of each 16-bit portion is zero for sign=0 and is MSB for sign=1.

Half-word (Form1. Form0=10) FIG. 5B illustrates the case 342 for half-word operations. If half-word operation is required, then the multiplicand 212 is first partitioned into two 16-bit blocks and then sign-extended to 32-bits to produce a 64-bit output. In case of unsigned operands, the SE bits are set to '0,' while in case of signed operands these bits are the most significant bit of the partitioned multiplicand. In case of half-word operations, input bits 0–15 of bus 212 are mapped to bits 0–15 of bus 224, and input bits 16–31 of bus 212 mapped to 32–48 of bus 224. Bits 31 to 0 of bus 224 comprise 16 sign extensions, SE, followed by bits 15 through 0 of the multiplicand 212. Bits 63 to 32 of bus 224 comprise 16 sign extensions, SE, followed by bits 31 through 16 of the multiplicand 212. The value of SE for each 32-bit portion is zero for sign=0 and is MSB for sign=1.

Word (Form1, Form0=11) FIG. 5C illustrates the case 344 for word operations. In case of word operation, the multiplicand 212 is only sign-extended to 64-bits. In case of unsigned operands, the SE bits are set to '0,' while in case of signed operands, these bits are the most significant bit of the multiplicand. In case of word operations, the 31-bit input 212 is mapped to bits 0–31 of bus 224 with bits 63 to 32 of bus 212 being sign extended by SE. The value of SE for the 64-bit portion is zero for sign=0 and is MSB for sign=1.

The BES Circuit 230

Figure 6A:
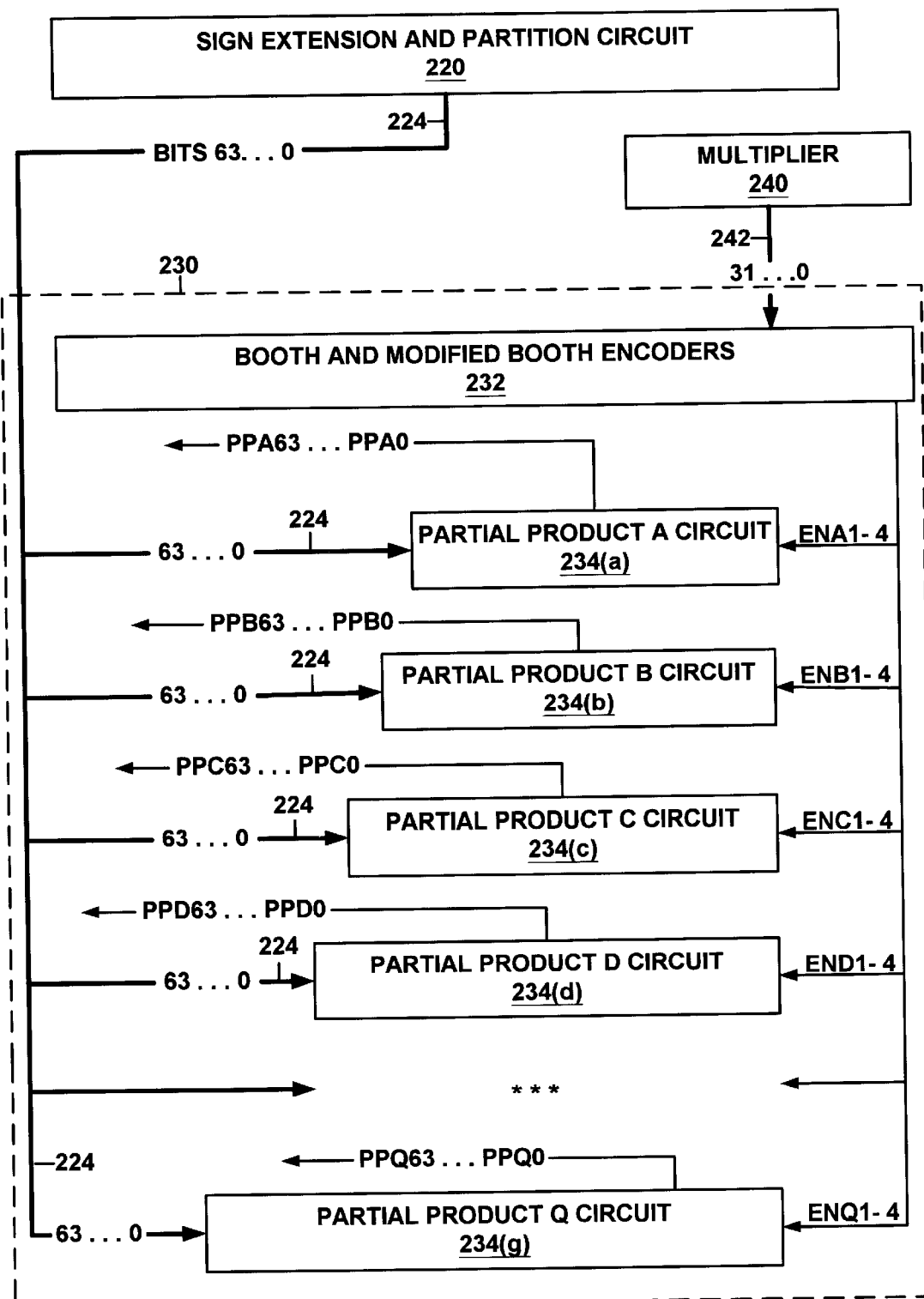
FIG. 6A is a logical block diagram of the Booth encoder and selector (BES) circuit of the high performance universal multiplier design of one embodiment of the present invention and illustrates the multiple partial product computation circuits.

FIG. 6A illustrates a circuit diagram of the BES circuit 230 in accordance with one embodiment of the present invention. The BES circuit 230 is shown coupled to the SEP circuit 220 and the multiplier operand 235. Although not shown in FIG. 6A, the BES circuit 230 supplies the compressor tree circuit 240 (shown in FIG. 3). The BES circuit 230 of FIG. 6A is responsible for the generation of 17 partial products (PPa–PPq) as shown in FIG. 3. The first partial product (PPa) is of 64-bits, and the subsequent partial products are reduced by two bits in size each to account for the left shifting of the summed products during multiplication. Therefore, the last partial product (PPq) is of only 32 bits. The BES circuit 230 also produces the '1' for each partial product which is required to be added to the 2's complement format for the case of negative partial products.

The inputs to BES circuit 230 are the 64-bit partitioned and sign extended multiplicand 224 produced by SEP circuit 220, the 32-bit multiplier operand 242 and format signals (f0 and f1) and the sign signal. The partition of the multiplicand according to the format signals (f0 and f1) is performed by the SEP circuit 220 while the partition of multiplier is performed in the Booth Encoder (BE) circuit 232. Booth encoders generate five outputs depending on three inputs (e.g., three bits, i−1, i, and i+1, of the multiplier operand) and follow the truth table shown in Table III below:

TABLE III

| bit (i+1) | bit (i) | bit (i−1) | Encoder Output |
|---|---|---|---|
| 0 | 0 | 0 | 0 |
| 0 | 0 | 1 | 1 x |
| 0 | 1 | 0 | 1 x |
| 0 | 1 | 1 | 2 x |
| 1 | 0 | 0 | −2 x |
| 1 | 0 | 1 | −1 x |
| 1 | 1 | 0 | −1 x |
| 1 | 1 | 1 | 0 |

In order to control the partial products according to the format signals (f0 and f1), at most three Booth encoders are used for each 16-bit segment of the multiplicand 224 to account for byte, half-word and word operations. In some cases, only two Booth encoders are required, and in other cases only one Booth encoder is used for a 16-bit segment. The required Booth encoders are located in the BE circuit 232. When two or three Booth encoders are used, the outputs of these encoders are passed through a 3:1 multiplexer which selects one of the Booth encoders' output according to the format signals (f0 and f1). The 3:1 multiplexers are located in the BE circuit 232 and the output of the 3:1 multiplexers are carried over the "EN" A–Q buses as shown in FIG. 6A. In case of byte operations, only first 5 (PPa–PPe) partial products are produced, and the remainder are set to zero. Similarly, in case of half-word operations, the first 9 (PPa–PPi) partial products are produced, and the remainder are set to zero.

FIG. 6B, FIG. 6C and FIG. 6D illustrate partial product generation 710, 720 and 730 for byte (8×8) multiplication, half-word (16×16) multiplication and word operations (32× 32) multiplication, respectively. The "r" designation represents the position where a "1" can be added for 2's complement negative representation. Column bit positions (as presented to the compressor tree circuit 240) are represented along the horizontal with the partial products PPa–PPq represented down the vertical.

With reference to FIG. 6A, a separate partial product generation circuit 234(a)–234(q) is provided for each partial product PPa–PPq, respectively. Each partial product generation circuit generates a 64-bit partial product that is to be compressed by the compressor tree 240. Each partial product generation circuit receives the 64 bits of the multiplicand operand over bus 224 and also receives a separate set of four EN signals designated as ENx1–ENx4 where x is a through q. Generally, the EN signals originate from the output of the 3:1 multiplexers of the BE circuit 232. For a respective partial product generation circuit, e.g., 234(a), a separate EN signal is provided for each 16-bit segment of its generated partial product. Therefore, four separate EN signals, ENA1–ENA4, are produced for all the 16-bit segments of the partial product, PPa, that is generated by partial product generation circuit, e.g., 234(a).

Each partial product generation circuit contains a 5:1 multiplexer for each bit generated in the respective partial product. The control signals ENx1–ENx4 control the select lines of these multiplexers for proper generation of the partial product. The inputs to the 5:1 multiplexers derive from the bits of the extended multiplicand on bus 224 and represent the 0, 1x, 2x, −1x and −2x possibilities for each bit position. For adding "1s," the output of the multiplexer at the appropriate location is then routed through another 2:1 multiplexer which is hardwired to select a "1" or the output of the corresponding 5:1 multiplexer.

Figure 8:
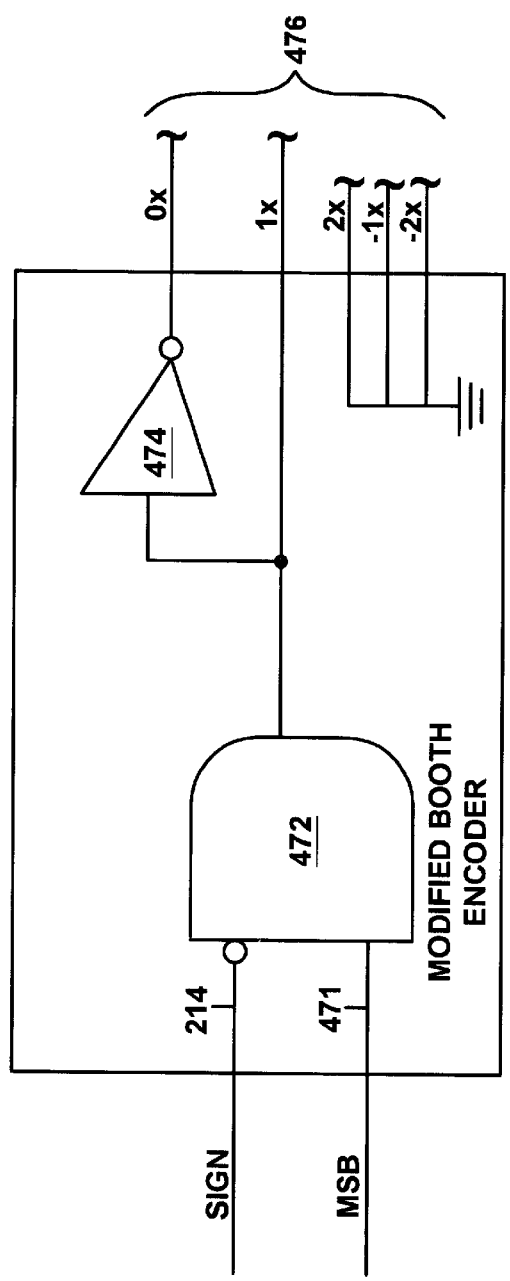
FIG. 8 illustrates a modified Booth encoder circuit used in the high performance universal multiplier of the present invention.

FIG. 7A, FIG. 7B, FIG. 7C and FIG. 7D illustrate the combinations of the multiplier operands input to the Booth encoders of the BE circuit 232 for generating the EN signals for each 16-bit segment of the partial product generation circuits 234(a)–234(q). The designation "0" (e.g., column 442 for PPa in FIG. 7D) represents a ground signal not bit0. For instance, in byte mode, bits 15 . . . 0 of PPa are controlled by the output of a Booth encoder circuit that receives bits0–1 of the multiplier 242 and a zero value as the third input. The other zero designation (e.g., column 442 for PPf in FIG. 7D) represents zeros produced for those bits of the corresponding partial product segment for that operational mode. For instance, bits 15 . . . 0 of PPf are zero in byte mode. Combinations that utilize the sign signal, "SIGN" and another bit of the multiplier 242 (e.g., column 442 for PPe in FIG. 7D) are fed to a modified Booth encoder as shown in FIG. 8 that accepts two inputs instead of three.

FIG. 7D illustrates a table 440 of the bit combinations fed to Booth encoders for generating the first 16 bits (15 . . . 0) of each partial product, PPa–PPq for each mode of operation. FIG. 7D generates the ENx1 signals where x is from a to q. Column 442 represents the bits used in byte mode, column 444 represents the bits used in the half word mode and column 446 represents the bits used in word mode. For instance, in half-word mode, to control the first 16-bits of. partial product PPe, bits 9, 8 and 7 of the multiplier 242 and fed to a Booth encoder circuit and the output controls the 16 multiplexers of circuit 234(k) that generate bits 15 . . . 0 of PPe.

FIG. 7C illustrates a table 430 of the bit combinations fed to Booth encoders of the BE circuit 232 for generating the second 16 bits (31 . . . 16) of each partial product, PPa–PPq for each mode of operation. FIG. 7C generates the ENx2 signals where x is from a to q. Column 432 represents the bits used in byte mode, column 434 represents the bits used in the half word mode and column 436 represents the bits used in word mode. For instance, in byte mode, to control the second 16-bits of partial product PPb, bits 11, 10 and 9 of the multiplier 242 and fed to a Booth encoder circuit and the output controls the 16 multiplexers of circuit 234(*b*) that generate bits 31 . . . 16 of PPb.

FIG. 7B illustrates a table 420 of the bit combinations fed to Booth encoders of the BE circuit 232 for generating the third 16 bits (47 . . . 32) of each partial product, PPa–PPq for each mode of operation. FIG. 7B generates the ENX3 signals where x is from a to q. Column 422 represents the bits used in byte mode, column 424 represents the bits used in the half word mode and column 426 represents the bits used in word mode. For instance, in word mode, to control the third 16-bits of partial product PPk, bits 21, 20 and 19 of the multiplier 242 are fed to a Booth encoder circuit and the output controls the 16 multiplexers of circuit 234(*k*) that generate bits 47 . . . 32 of PPk.

Lastly, FIG. 7A illustrates a table 410 of the bit combinations fed to Booth encoders of the BE circuit 232 for generating the fourth 16 bits (63 . . . 48) of each partial product, PPa–PPq for each mode of operation. FIG. 7A generates the ENx4 signals where x is from a to q. Column 412 represents the bits used in byte mode, column 414 represents the bits used in the half word mode and column 416 represents the bits used in word mode. For instance, in word mode, to control the fourth 16-bits of partial product PPd, bits 7, 6 and 5 of the multiplier 242 are fed to a Booth encoder circuit and the output controls the 16 multiplexers of circuit 234(*d*) that generate bits 63 . . . 48 of PPd.

As discussed above, the three input Booth encoder circuits used by the present invention each accepts three inputs and generates five outputs (0x, 1x, 2x, −1x, −2x) and are described in co-pending patent application entitled "Multiplier Circuit Having Optimized Booth Encoder/Selector," filed on Mar. 29, 1999, Ser. No. 09/280,176 as referenced above.

FIG. 8 illustrates a modified Booth encoder circuit 470 that accepts two input signals and generates five outputs (0x, 1x, 2x, −1x, −2x) 476. An example using circuit 470 is shown in FIG. 7D, column 442 for PPe. In FIG. 8, the first input signal is the sign signal 214 that is fed to the low asserted input of AND gate 472 which also receives the second input 471, typically the MSB of the relevant bit segment. The output of the AND gate 472 produces the 1x output and is inverted using gate 474 to produce the 0x output. The other outputs (2x, −1x and −2x) are zero.

Figure 9A:
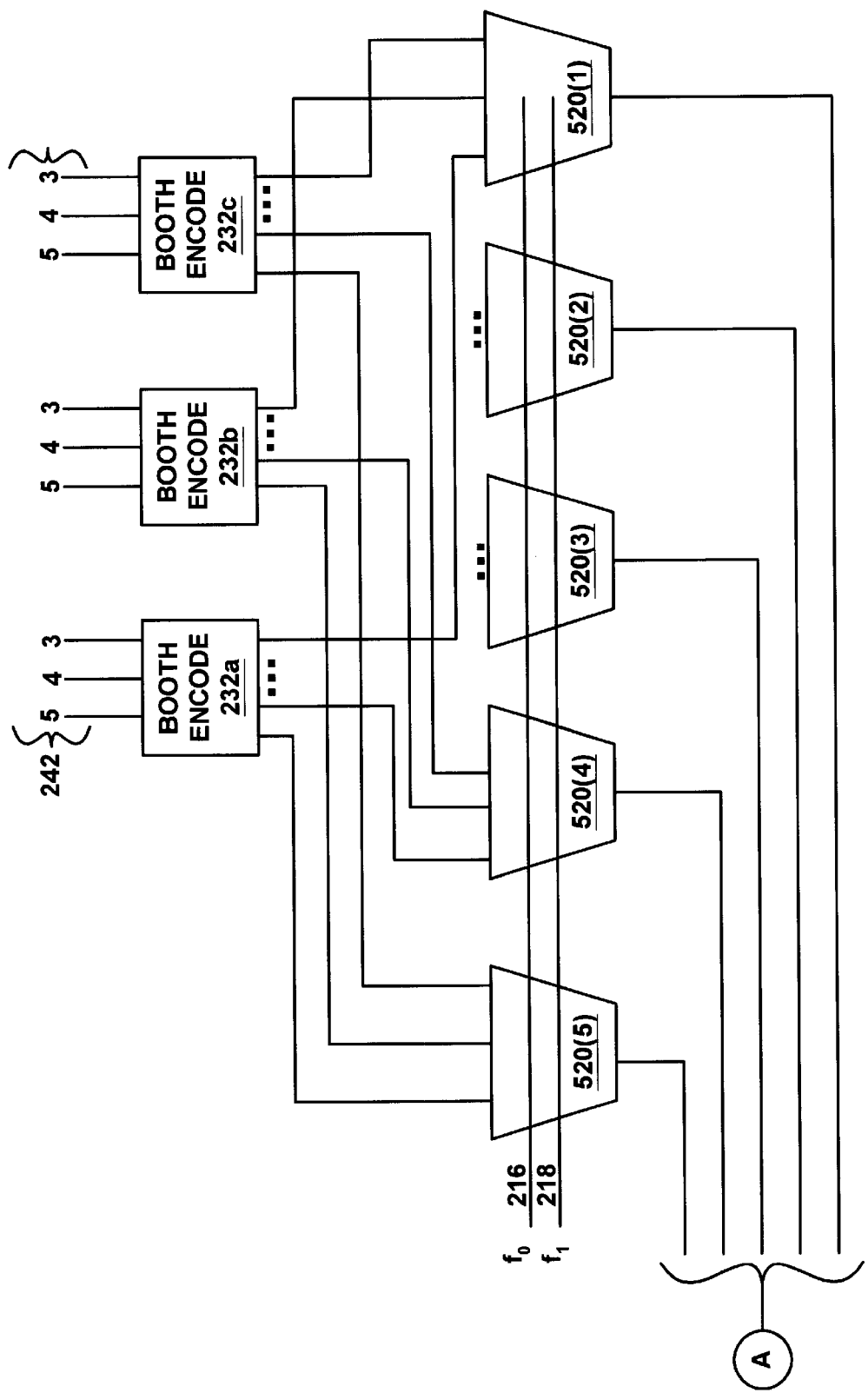
FIG. 9A is a circuit diagram the circuitry that generates bits 0 . . . 15 of the partial product (PPc) including the relevant Booth encoders, 3-input multiplexers and 5-input multiplexers of the Booth encoder and selector circuit of the present invention.
Figure 9A:
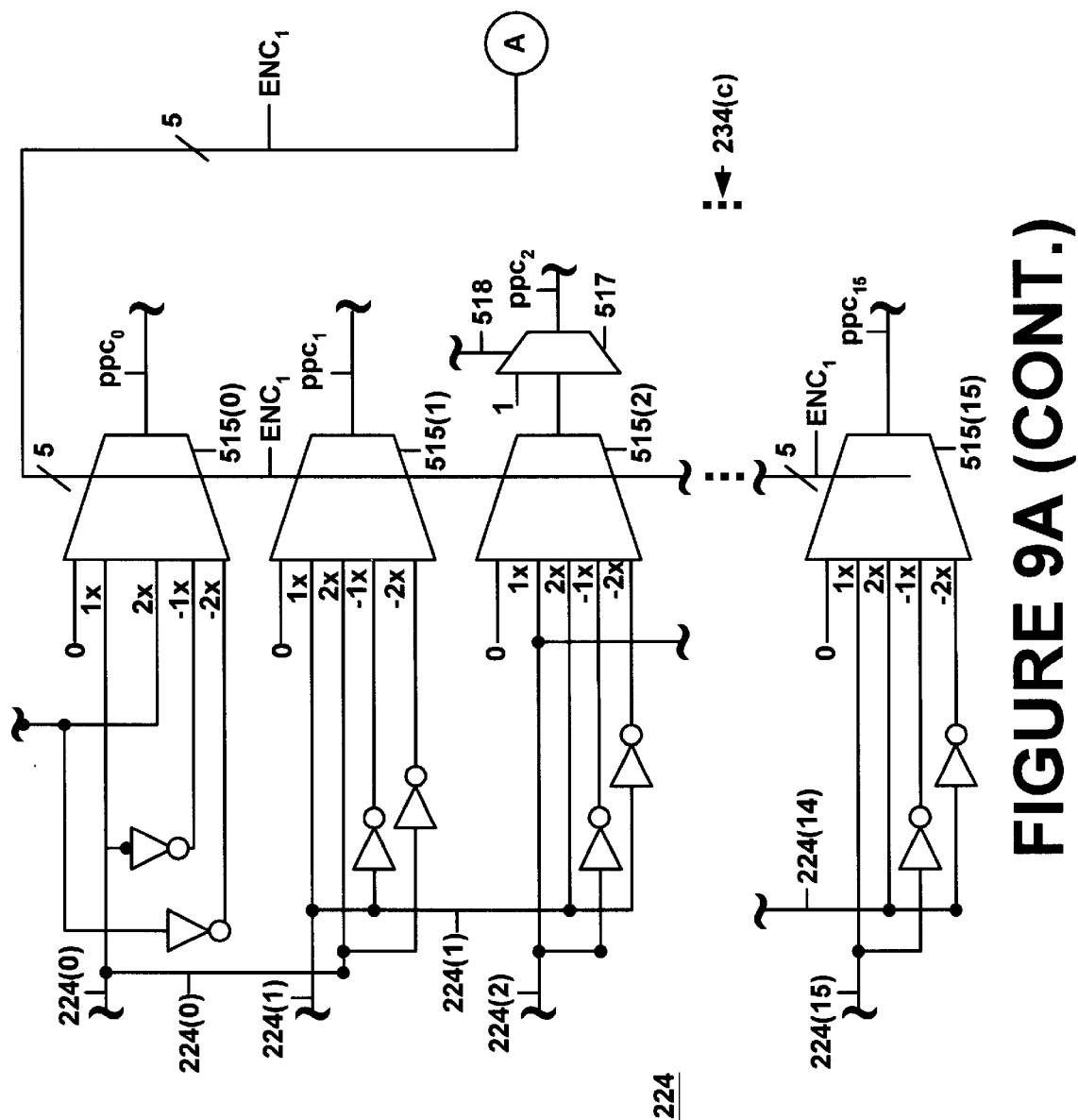
Figure 9B:
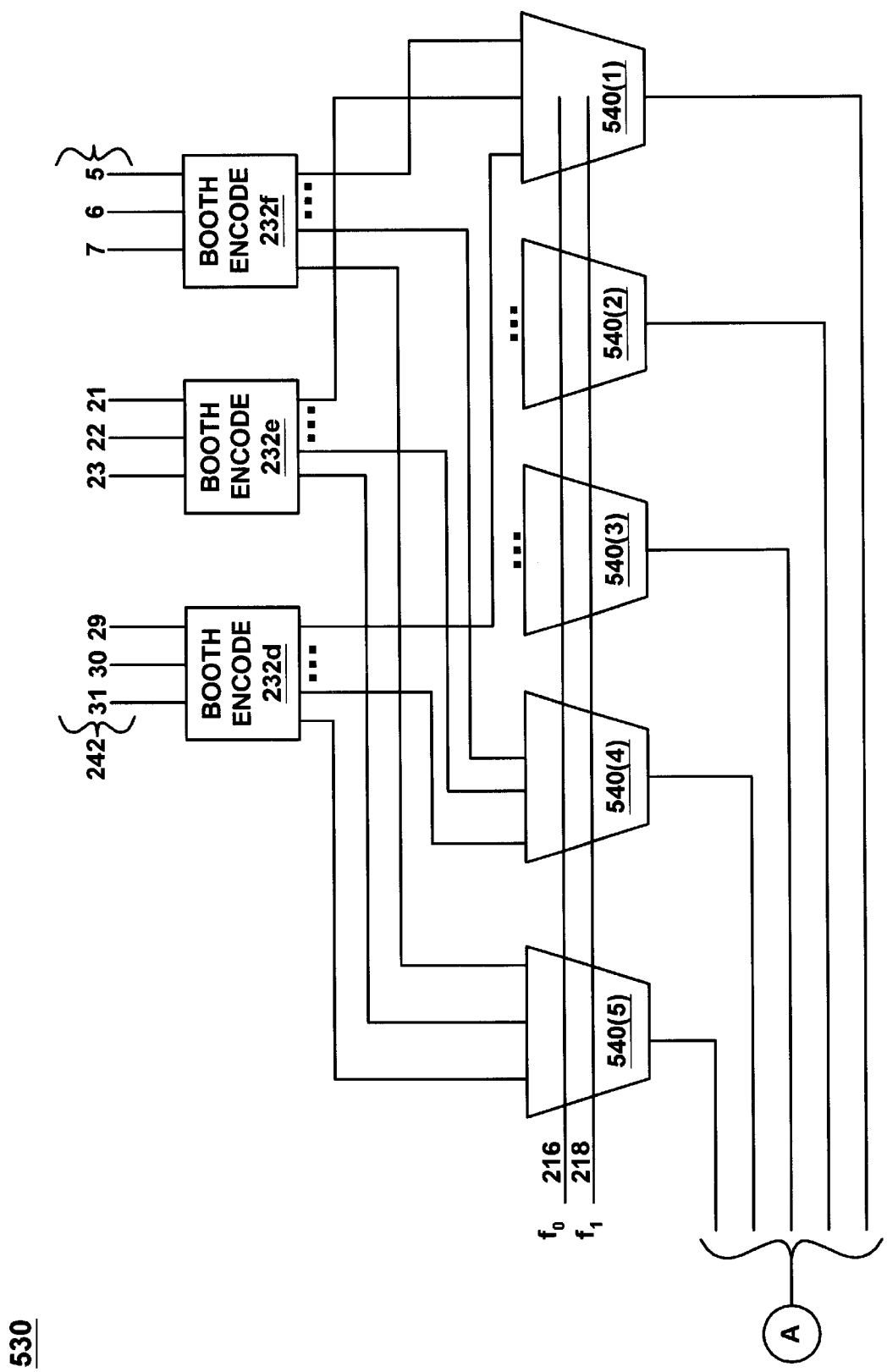
FIG. 9B is a circuit diagram the circuitry that generates bits 48 . . . 63 of the partial product (PPd) including the relevant Booth encoders, 3-input multiplexers and 5-input multiplexers of the Booth encoder and selector circuit of the present invention.
Figure 9B:
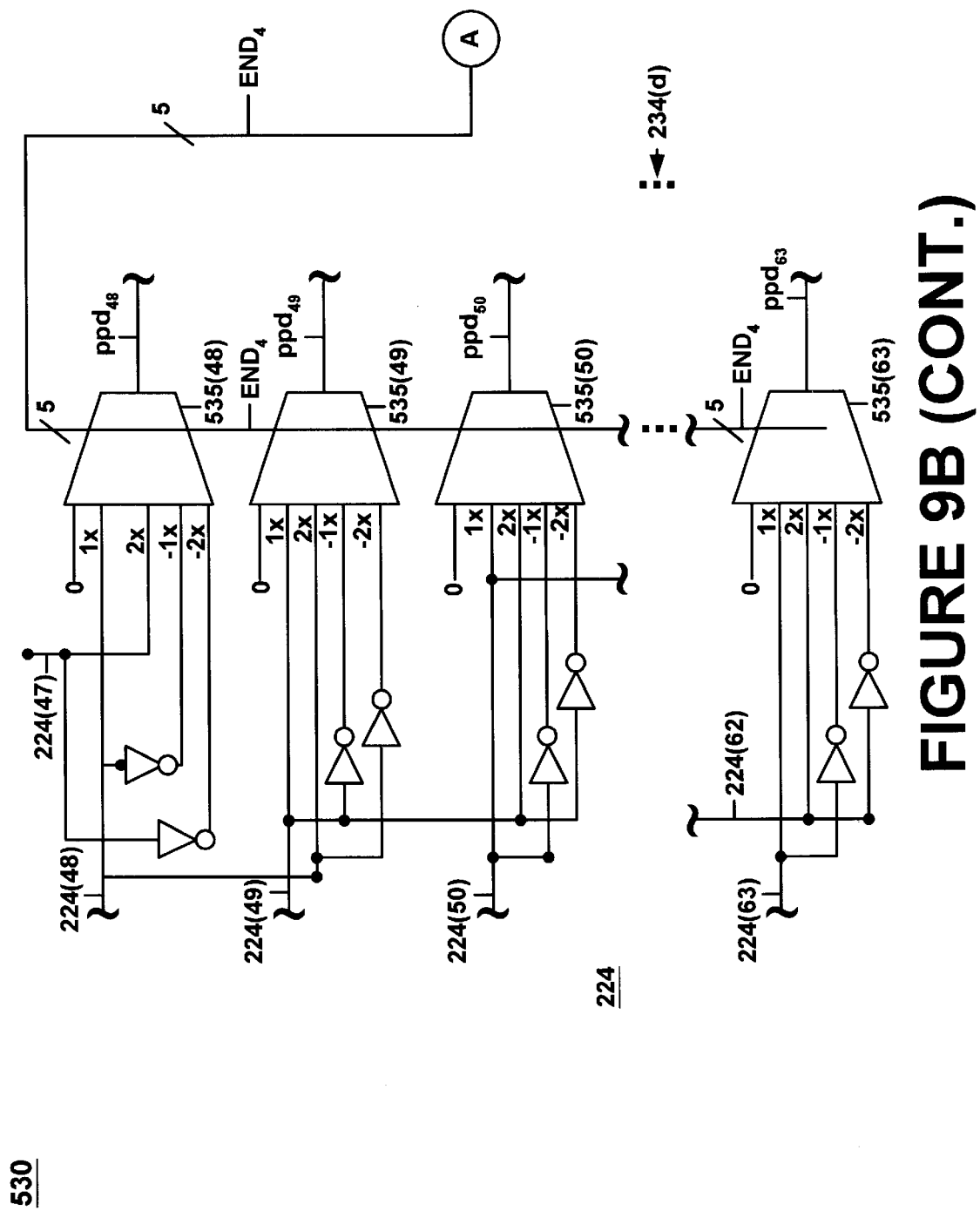
Figure 9C:
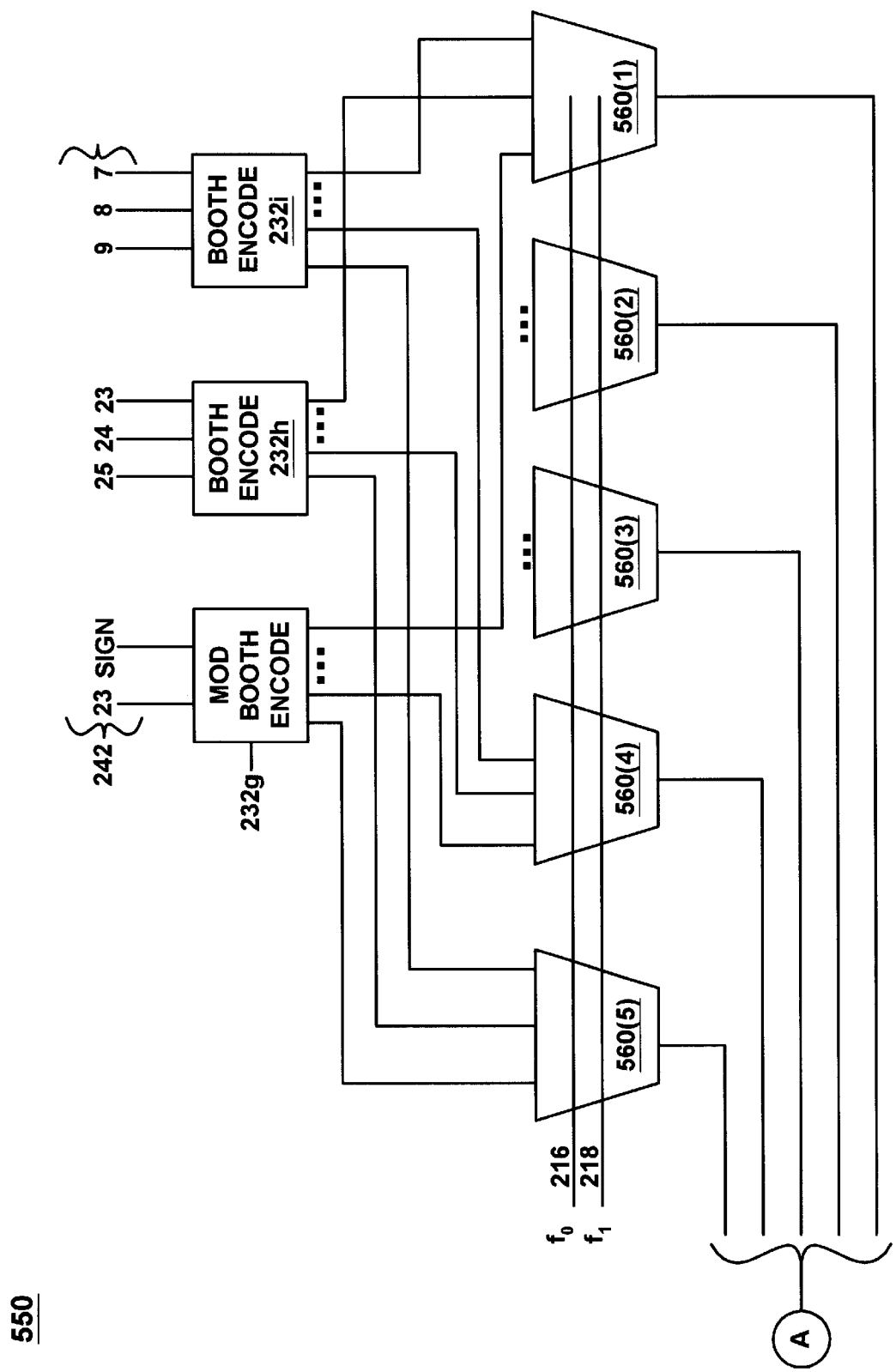
FIG. 9C is a circuit diagram the circuitry that generates bits 32 . . . 47 of the partial product (PPe) including the relevant Booth encoders, 3-input multiplexers and 5-input multiplexers of the Booth encoder and selector circuit of the present invention.
Figure 9C:
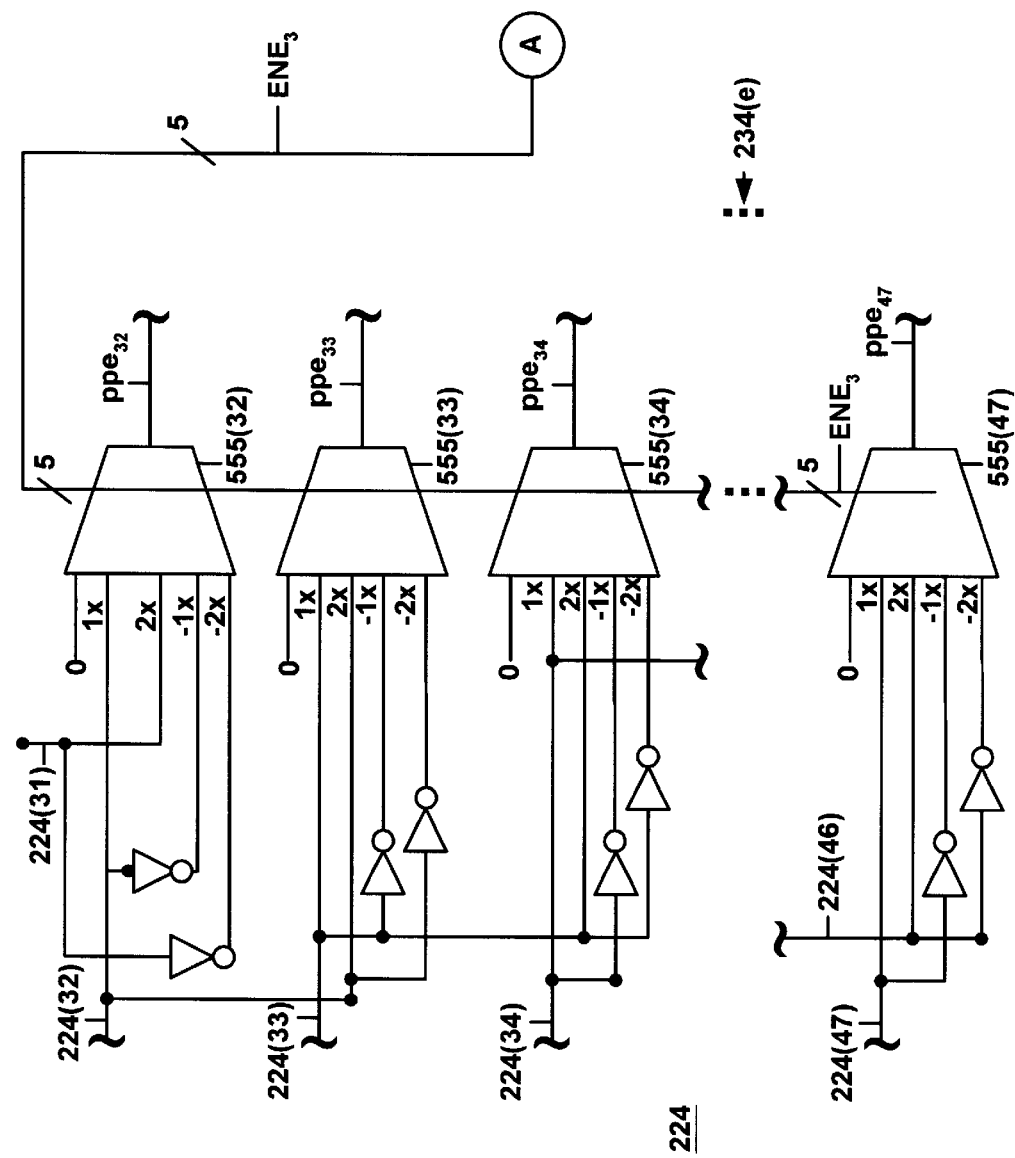

FIG. 9A, FIG. 9B and FIG. 9C illustrate examples of the circuitry used in the BES circuit 230 for generating partial products according to the tables of FIG. 7A through FIG. 7D. FIG. 9A, FIG. 9B and FIG. 9C illustrate examples that require some form of Booth encoding for each operational mode (byte, half-word, word).

FIG. 9A illustrates circuitry 510 used to generate bits 15 . . . 0 of partial product PPc. Circuitry 510 contains 16 5:1 multiplexers 515(0)–515(15) that reside in partial product generator circuit 234(*c*). They are each controlled by a five bit control bus ENC1. The "0x" input of each 5:1 multiplexer is grounded ("0"). The "1x" input of each 5:1 multiplexer receives its respective same bit of the multiplicand of bus 224. The "2x" input of each 5:1 multiplexer receives its respective bit shifted by one bit position of the multiplicand of bus 224 to perform the 2x operation. For example, the "2x" input of multiplexer 515(1) receives bit0 of bus 224. The "−1x" input of each 5:1 multiplexer receives the inverted signal of the "1x" input. The "−2x" input of each 5:1 multiplexer receives the inverted signal of the "2x" input. This is done for each 5:1 multiplexer. The output of the multiplexers 515(0)–515(15) are bits 0 . . . 15 of partial product PPc, except for bit2. Bit2 performs the addition of the "1" in case of negative values in 2's complement and therefore is multiplexed with multiplexer 517 which generates the bit2 value based on control 518. Whenever partial product PPb is negative, a "1" is inserted at bit2 of PPc (see FIGS. 2A–2C for PPc).

FIG. 9A also illustrates the Booth encoding of BE circuit 232. As shown in FIG. 7D, in either byte, word or half-word modes, the bits 5, 4, and 3 of the multiplier 242 are used. These bits are fed to Booth encoders 232*a*–232*c*. It is appreciated that the same Booth encoder could be used in this case because the inputs are same for each mode. The first output of each encoder is fed to 3:1 multiplexer 520(1) and the second output of each encoder is fed to 3:1 multiplexer 520(2) and the third output of each encoder is fed to 3:1 multiplexer 520(3) and so forth until the last output of each encoder is fed to 3:1 multiplexer 520(5). Multiplexers 520(1)–520(5) select the proper Booth encoding for the selected operational mode (byte, half-word or word) and are controlled by the partition control (f0 and f1). The outputs of multiplexers 520(1)–520(5) are the five signals that make up ENC1. Different Booth encoders and control circuitry are used to control the other 48 bits of PPc in accordance with the tables of FIGS. 7A–7C.

FIG. 9B illustrates circuitry 530 used to generate bits 63 . . . 48 of partial product PPd. Circuitry 530 contains 16 5:1 multiplexers 535(48)–535(63) that reside in partial product generator circuit 234(*d*). They are each controlled by a five bit control bus END4. The 16 5:1 multiplexers 535(48)–535(63) are configured as shown in FIG. 9A except they receive their respective bits (b47–b63) of the multiplicand of bus 224. The output of the multiplexers 535(48)–535(63) are bits 48 . . . 63 of partial product PPd. FIG. 9B also illustrates the Booth encoding of BE circuit 232. As shown in FIG. 7A, in byte, word, and half-word modes, bits 31, 30 and 29 or bits 23, 22 and 21 or bits 7, 6 and 5, respectively, of multiplier 242 are used. These bits are fed to Booth encoders 232*d*–232*f*. The first output of each encoder is fed to 3:1 multiplexer 540(1) and the second output of each encoder is fed to 3:1 multiplexer 540(2) and so forth until the last output of each encoder is fed to 3:1 multiplexer 540(5). Multiplexers 540(1)–540(5) are controlled by the partition control (f0 and f1) and their outputs are the five signals of END4. Different Booth encoders and control circuitry are used to control the other 48 bits of PPd in accordance with the other data of FIGS. 7B–7D.

FIG. 9C illustrates circuitry 550 used to generate bits 47 . . . 32 of partial product PPe. In this example, a modified booth encoder is used at 232*g*. Circuitry 550 contains 16 5:1 multiplexers 555(32)–555(47) that reside in partial product generator circuit 234(*e*). They are each controlled by a five bit control bus ENE3. The 16 5:1 multiplexers 555(32)–555 (47) are configured as shown in FIG. 9A except they receive their respective bits (b31–b47) of the multiplicand of bus 224. The output of the multiplexers 555(32)–555(47) are bits 32 . . . 47 of partial product PPe. FIG. 9C also illustrates the Booth encoding of BE circuit 232. As shown in FIG. 7B, in word and half-word modes bits 25, 24 and 23 or bits 9, 8 and 7, respectively, of multiplier 242 are used. These bits are fed to Booth encoders 232*h*–232*i*. In byte mode, only the sign bit 214 and bit 23 are used. These bits are fed to modified Booth encoder 232*g*. The first output of each encoder is fed to 3:1 multiplexer 560(1) and the second output of each encoder is fed to 3:1 multiplexer 560(2) and so forth until the last output of each encoder is fed to 3:1 multiplexer 560(5). Multiplexers 560(1)–560(5) are controlled by the partition control (f0 and f1) and their outputs are the five signals of ENE3. Different Booth encoders and control circuitry are used to control the other 48 bits of PPe in accordance with the other data of FIGS. 7A, 7C and 7D.

Figure 10A:
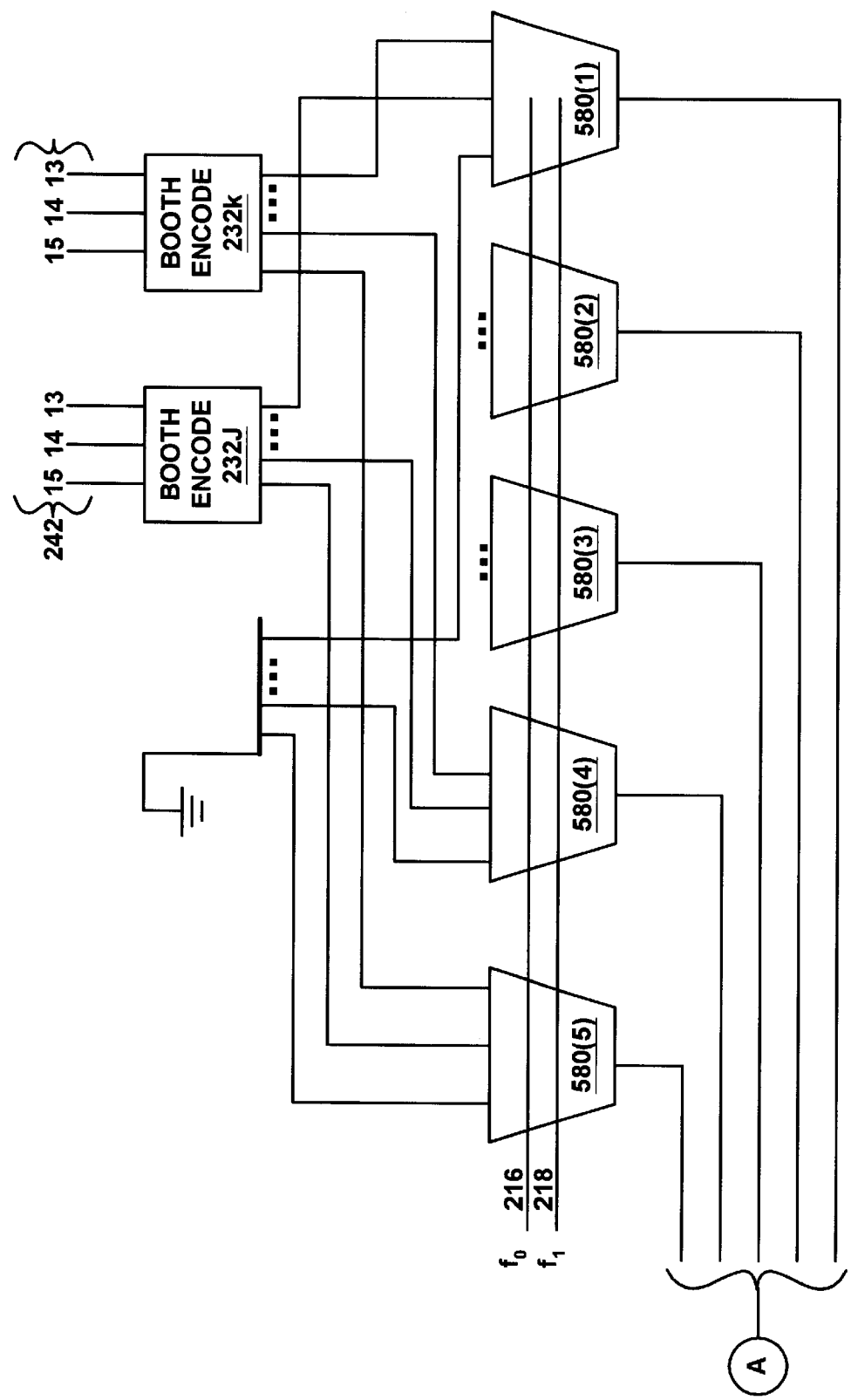
FIG. 10A is a circuit diagram the circuitry that generates bits 0 . . . 15 of the partial product (PPh) including the relevant Booth encoders, 3-input multiplexers and 5-input multiplexers of the Booth encoder and selector circuit of the present invention.
Figure 10A:
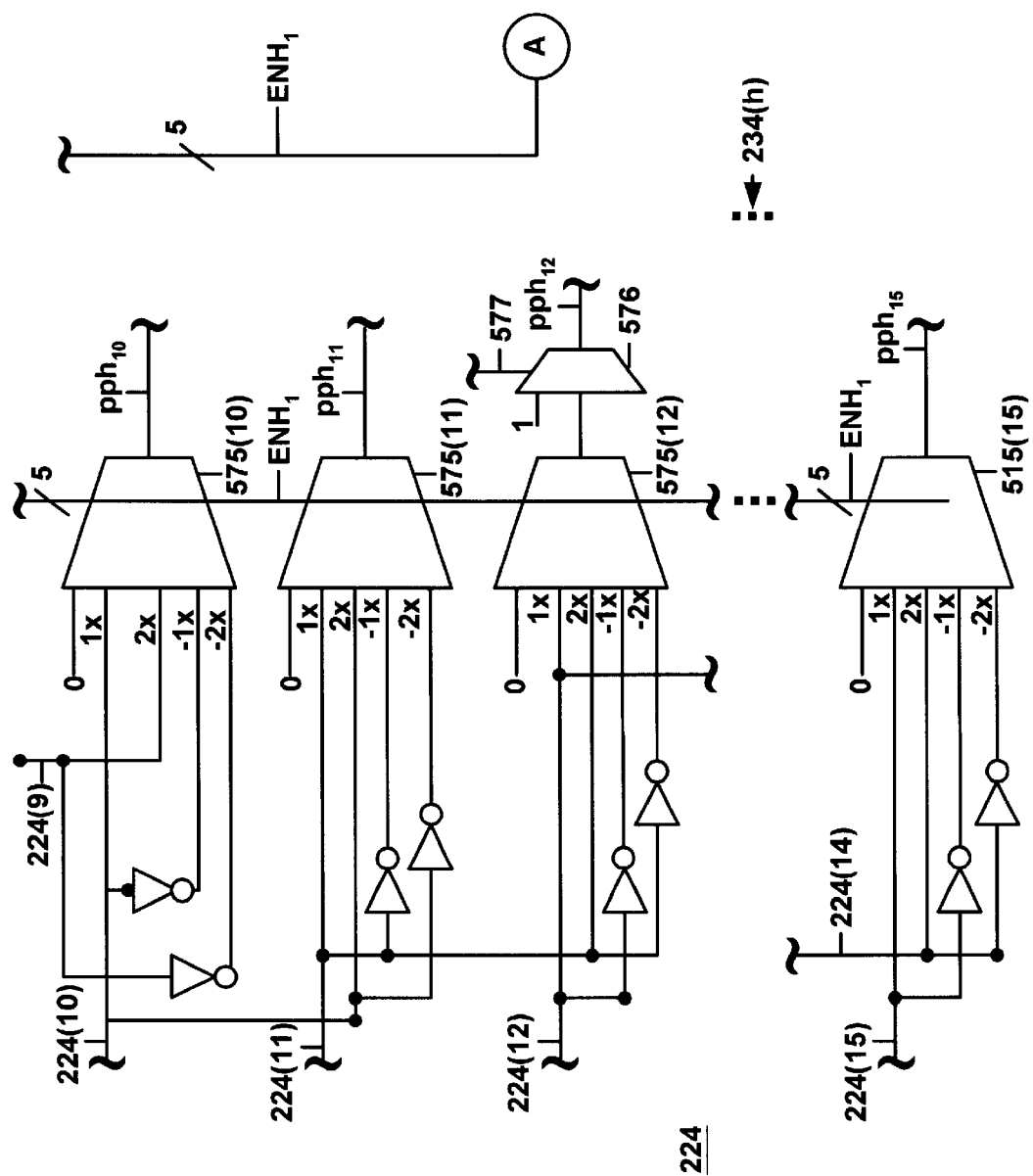
Figure 10B:
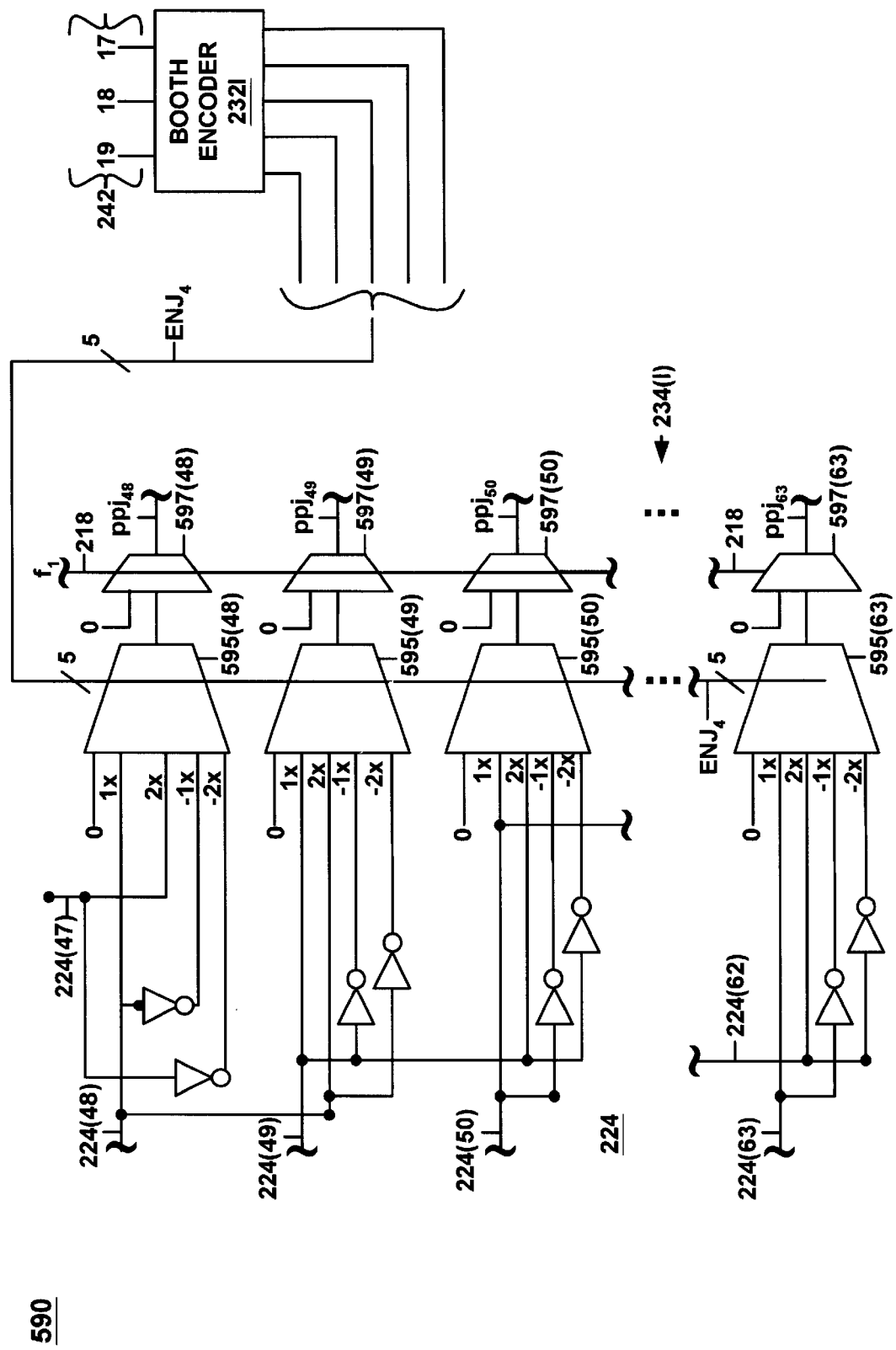
FIG. 10B is a circuit diagram the circuitry that generates bits 48 . . . 63 of the partial product (PPj) including the relevant Booth encoders, 5-input multiplexers and 2-input multiplexers of the Booth encoder and selector circuit of the present invention.

FIG. 10A and FIG. 10B illustrate examples of the circuitry used in the BES circuit 230 for generating partial products according to the tables of FIG. 7A through FIG. 7D for instances that require no Booth encoding for one or two operational modes.

FIG. 10A illustrates circuitry 570 for generating bits 0–15 of partial product PPh. According to FIG. 7D, PPh requires booth encoding only for the half-word and word modes. The byte mode requires all zeros for bits 0–15. Therefore, only two Booth encoders are used, 232j and 232k, which each receive bits 15, 14 and 13 of the multiplier 242. This circuitry is located in BE circuit 232. It is appreciated that in this case one Booth encoder can be used. The first output of each encoder, and a zero, is fed to 3:1 multiplexer 580(1) and the second output of each encoder, and a zero, is fed to 3:1 multiplexer 580(2) and so forth until the last output of each encoder, and a zero, is fed to 3:1 multiplexer 580(5). Multiplexers 580(1)–580(5) are controlled by the partition control (f0 and f1) and their outputs are the five signals of ENH1 which controls the 16 5:1 multiplexers 575(0)–575(15). Multiplexers 575(0)–575(15) generate bits 0–15 of PPh except for bit B12 which is fed to 2:1 multiplexer 575 which adds a "1" when partial product PPg is negative. Multiplexers 575(0)–575(15) are located in circuit 234(h). Different Booth encoders and control circuitry are used to control the other 48 bits of PPh in accordance with the other data of FIGS. 7A–7C.

FIG. 10B illustrates circuitry 590 for generating bits 48–63 of partial product PPj. According to FIG. 7A, PPj requires booth encoding only for the word mode. The byte and half-word modes require all zeros for these bits of PPj. Therefore, only one Booth encoder is used, 232l in circuit 590. Booth encoder 232l receives bits 19, 18 and 17 of the multiplier 242. This circuitry is located in BE circuit 232. The Booth encoder 232l directly supplies the five outputs for the ENJ4 bus which controls the 16 5:1 multiplexers 595(48)–595(63). Multiplexers 575(0)–575(15) are located in circuit 234(J). The outputs of the multiplexers 595(48)–595(63) are fed to the respective inputs of 2:1 multiplexers 597(48)–597(63) which also receive a "0" input. The 2:1 multiplexers 597(48)–597(63) are controlled by the f1 signal 218 so that a zero is produced in bits 63 . . . 48 of PPj in byte and half word modes. Different Booth encoders and control circuitry are used to control the other 48 bits of PPh in accordance with the other data of FIGS. 7B–7D.

Partition of Carry Save Adder Tree Circuit 240

During the addition of partial products, the carries generated at the partition boundaries should not be added with the partial products of the next partition, e.g. in case of byte operation, the carries generated at column 16, 32, and 48 should be prohibited to cross the boundary and add with the rest of the partial products. Similarly, in case of half-word operation the carries generated at column 32 should be prevented from addition with the rest of partial products. This condition requires a partitioned CSA tree for the addition of partial products. Since CSA is on the critical path of the multiplier, the delay of partitioning behind the actual delay of the CSA is hidden, so that the total delay is not increased by partitioning.

Figure 11:
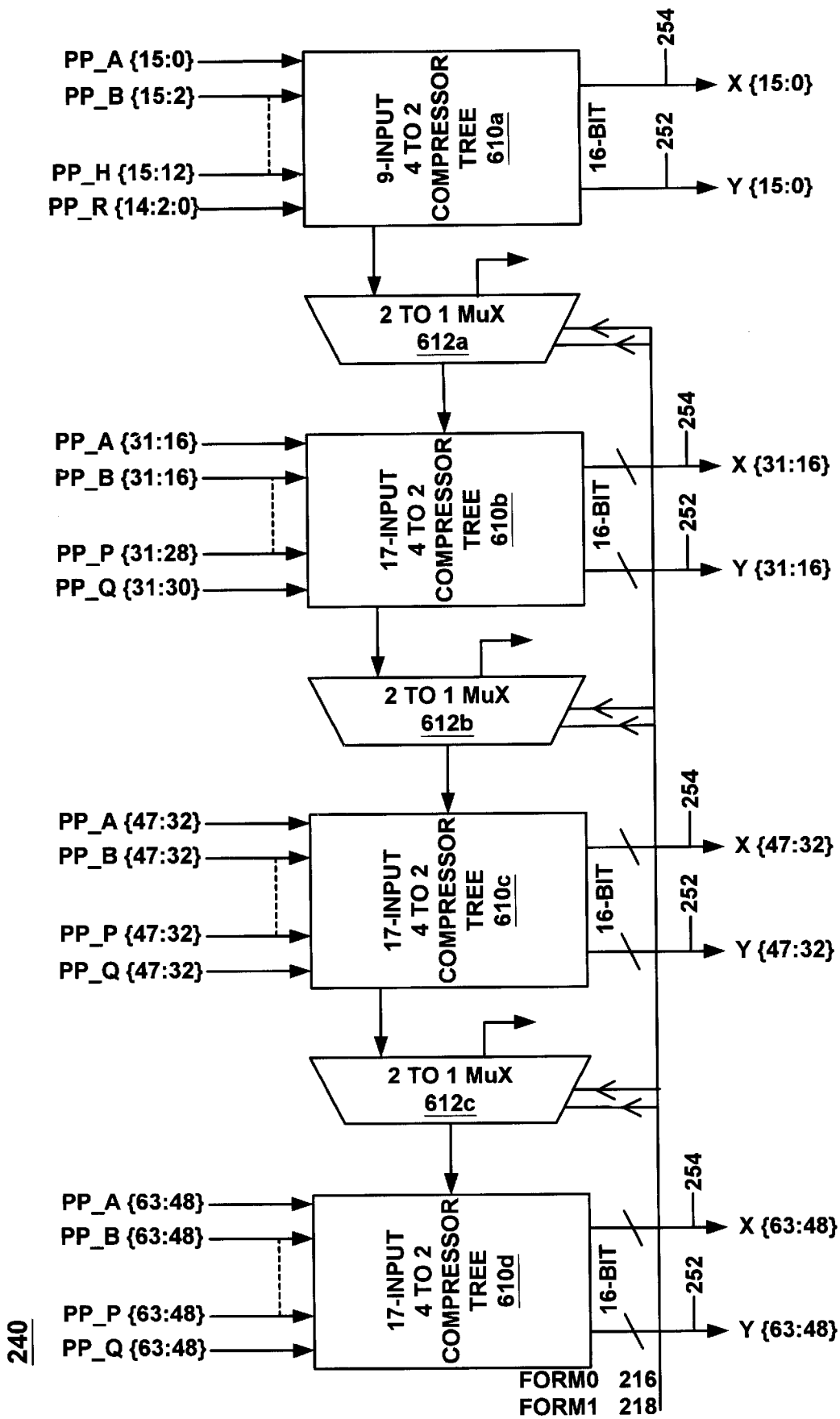
FIG. 11 is a schematic diagram of the 4 to 2 compressor tree circuit of the high performance universal multiplier circuit of one embodiment of the present invention.

FIG. 11 illustrates the 4 to 2 compressor tree circuits 610a–610d used by circuit 240. A timing critical portion of the multiplier is the Wallace tree using 4 to 2 compressors. For timing reasons, a balanced Wallace tree is used. This tree adds 17 partial products and produces two (sum and Carry) vectors of 64 bits each. FIG. 11 illustrates the complete compressor tree. All the blocks of the compressor are identical, except the first block 610a which adds only 9 partial products. Each block of the compressor is composed of 4 to 2 compressors sub-blocks. There are 4 partial rows of 4 to 2 compressors in the first compressor and 8 rows of 4 to 2 compressors in the rest of the compressor blocks. Circuits 610a–610d receive bits of the partial products PPa–PPq as shown in FIG. 11.

The multiplexers 612a–612c between the compressor blocks 610a–610d control the carry propagation from one compressor block to another in case of byte, half-word, and word operations and are controlled by the partitioning control signals (f0 and f1). Circuit 610a generates bits 15:0 of the sum 254 and carry 252 vectors. Circuit 610b generates bits 31:16 of the sum 254 and carry 252 vectors. Circuit 610c generates bits 47:32 of the sum 254 and carry 252 vectors. Circuit 610d generates bits 63:48 of the sum 254 and carry 252 vectors. The highly regular structure of the compressor makes it ideally suited for VLS1 implementation. The output of the compressor tree 240 s latched in pipeline registers (FIG. 3) for further processing in the next cycle.

Partitioned Carry Propagate Adder (CPA) 260

Like the addition of partial products, the addition of final sum 254 and carry 252 vectors also require that the carries generated at the partition boundaries should not be added with the carry and sum vectors of the other partition.

In order to get the final result of the multiplication, the 64-bit sum 254 and carry vectors 252 of FIG. 3 produced by the 4 to 2 compressor tree 240 in the first cycle are added using a partitioned carry propagate adder (CPA) 260. The adder is partitioned at 16-bit, and 32-bit intervals to support 8-bit, and 16-bit multiplications along with 32-bit multiplication in case of no partition. The adder 260 partition is achieved using form0 and form1 control signals. If form0=form1=0, then the adder is partitioned for 16 bits, if form0=1 and form1=0 then the adder is partitioned for 32-bit addition, and finally if form0=form1=1 no partition is performed and the adder acts as a single 64 bit adder. As described above, adder 260 is described in co-pending patent application entitled "A Multiplexer-Based Parallel N-Bit Adder Circuit for High Speed Processing," filed on Mar. 23, 1999, Ser. No. 09/275,068.

The preferred embodiment of the present invention, a high performance universal, partitioned, 32×32 bit multiplier circuit, is thus described. While the present invention has been described in particular embodiments, it should be appreciated that the present invention should not be construed as limited by such embodiments, but rather construed according to the below claims.

What is claimed is:

1. A partitioned multiplier comprising:
a booth encoder and selector circuit receiving a multiplicand and receiving an n-bit multiplier, said booth encoder and selector circuit simultaneously generating a plurality of partial products for byte, half-word and word multiply operations based on a partitioning signal;
a compressor tree receiving said plurality of partial products and generating therefrom a sum vector and a carry vector; and a partitioned carry propagate adder circuit adding said sum and said carry vectors and producing a 2n-bit output, wherein said 2n-bit output is generated with constant latency, having a single cycle throughput, for each of said byte, half-word and word multiply operations.

2. A partitioned multiplier as described in claim 1 wherein said booth encoder and selector circuit is based on Booth-3 encoding.

3. A partitioned multiplier as described in claim 1 wherein said booth encoder and selector circuit is based on Booth-4 encoding.

4. A partitioned multiplier as described in claim 1 wherein said constant latency is two clock cycles.

5. A partitioned multiplier as described in claim 1 wherein said constant latency is one clock cycle.

6. A partitioned multiplier comprising:
  a sign extension and partitioning circuit receiving an n-bit multiplicand and producing a 2n-bit extended multiplicand based on a partitioning signal;
  a booth encoder and selector circuit receiving said 2n-bit extended multiplicand and receiving an n-bit multiplier, said booth encoder and selector circuit simultaneously generating (n/2+1) partial products for byte, half-word and word multiply operations based on said partitioning signal;
  a compressor tree receiving said (n/2+1) partial products and generating therefrom a sum vector and a carry vector; and
  a partitioned carry propagate adder adding said sum and said carry vectors and producing a 2n-bit output, wherein said 2n-bit output is generated with a constant latency having a single cycle throughput for each of said byte, half-word and word multiply operations.

7. A partitioned multiplier as described in claim 6 wherein n=32.

8. A partitioned multiplier as described in claim 6 wherein said booth encoder and selector circuit comprises:
  a plurality of booth encoder circuits coupled to receive said n-bit multiplier and for generating encoded outputs; and
  a separate partial product circuit for generating each of said (n/2+1) partial products and wherein each partial product circuit receives a portion of said encoded outputs and receives said extended multiplicand.

9. A partitioned multiplier as described in claim 6 wherein said multiplicand and said multiplier each comprise four 8-bit operands, said partitioned multiplier simultaneously performing four 8×8 bit multiply operations and wherein said 2n-bit output comprises four 16-bit results.

10. A partitioned multiplier as described in claim 6 wherein said multiplicand and said multiplier each comprise two 16-bit operands, said partitioned multiplier simultaneously performing two 16×16 bit multiply operations and wherein said 2n-bit output comprises two 32-bit results.

11. A partitioned multiplier as described in claim 6 wherein said multiplicand and said multiplier each comprise one 32-bit operand, said partitioned multiplier performing one 32×32 bit multiply operation and wherein said 2n-bit output comprises one 64-bit result.

12. A partitioned multiplier as described in claim 6 wherein each partial product of said 17 partial products are Booth encoded partial products.

13. A partitioned multiplier as described in claim 6 wherein said sign extension and partitioning circuit, said booth encoder and selector circuit and said compressor tree all operate within a first pipeline stage and wherein further said partitioned carry propagate adder operates in a second pipeline stage of a two cycle latency.

14. A partitioned multiplier comprising:
  a sign extension and partitioning circuit receiving a 32-bit multiplicand and producing a 64-bit extended multiplicand;
  a booth encoder and selector circuit receiving said 64-bit extended multiplicand and receiving a 32-bit multiplier, said booth encoder and selector circuit simultaneously generating 17 partial products for performing byte, half-word and word multiply operations based on a partition signal, wherein partial products 6–17 are zero for said byte multiply operations and wherein partial products 10–17 are zero for said half-word multiply operations;
  a compressor tree receiving said 17 partial products and generating therefrom a sum vector and a carry vector; and
  an adder circuit adding said sum and said carry vectors and producing a 64-bit output, wherein said 64-bit output is generated with two cycle latency and single cycle throughput for each of said byte, half-word and word multiply operations.

15. A partitioned multiplier as described in claim 14 wherein said booth encoder and selector circuit comprises:
  a plurality of booth encoder circuits coupled to receive said n-bit multiplier and for generating encoded outputs; and
  a separate partial product circuit for generating each of said 17 partial products and wherein each partial product circuit comprises a plurality of multiplexers, receives a portion of said encoded outputs and receives said extended multiplicand.

16. A partitioned multiplier as described in claim 14 wherein said adder circuit is a partitioned carry propagate adder circuit.

17. A partitioned multiplier as described in claim 14 wherein said multiplicand and said multiplier each comprise four 8-bit operands, said multiplier simultaneously performing four 8×8 bit multiply operations and wherein said 64-bit output comprises four 16-bit results.

18. A partitioned multiplier as described in claim 14 wherein said multiplicand and said multiplier each comprise two 16-bit operands, said multiplier simultaneously performing two 16×16 bit multiply operations and wherein said 64-bit output comprises two 32-bit results.

19. A partitioned multiplier as described in claim 14 wherein said multiplicand and said multiplier each comprise one 32-bit operand, said partitioned multiplier performing one 32×32 bit multiply operation and wherein said 64-bit output comprises one 64-bit result.

20. A partitioned multiplier as described in claim 14 wherein each partial product of said 17 partial products are Booth encoded values.

21. A partitioned multiplier as described in claim 14 wherein said sign extension and partitioning circuit, said booth encoder and selector circuit and said compressor tree all operate within a first pipeline stage and wherein further said adder circuit operates in a second pipeline stage of said two cycle latency.

22. A partitioned multiplier comprising:
  a sign extension and partitioning means for receiving an n-bit multiplicand and for producing a 2n-bit extended multiplicand based on a partition signal;
  a booth encoder and selector means receiving said 2n-bit extended multiplicand and receiving an n-bit multiplier, said booth encoder and selector means for simultaneously generating (n/2+1) partial products for byte, half-word and word multiply operations based on said partition signal;

a compressor tree means receiving said (n/2+1) partial products and for generating therefrom a sum vector and a carry vector; and a partitioned carry propagate adder means for adding said sum and said carry vectors and for producing a 2n-bit output, wherein said 2n-bit output is generated with constant cycle latency and single cycle throughput for said byte, half-word and word multiply operations.

23. A partitioned multiplier as described in claim 22 wherein n=32.

24. A partitioned multiplier as described in claim 22 wherein said multiplicand and said multiplier each comprise four 8-bit operands, said multiplier simultaneously performing four 8×8 bit multiply operations and wherein said 2n-bit output comprises four 16-bit results.

25. A partitioned multiplier as described in claim 22 wherein said multiplicand and said multiplier each comprise two 16-bit operands, said multiplier simultaneously performing two 16×16 bit multiply operations and wherein said 2n-bit output comprises two 32-bit results.

26. A partitioned multiplier as described in claim 22 wherein said multiplicand and said multiplier each comprise one 32-bit operand, said partitioned multiplier performing one 32×32 bit multiply operation and wherein said 64-bit output comprises one 64-bit result.

27. A partitioned multiplier as described in claim 22 wherein each partial product of said (n/2+1) partial product are Booth encoded values.

28. A partitioned multiplier as described in claim 22 wherein said sign extension and partitioning means, said booth encoder and selector means and said compressor tree means all operate within a first pipeline stage and wherein further said partitioned carry propagate adder means operates in a second pipeline stage of said two cycle-latency.

* * * * *